United States Patent
Yachi et al.

(10) Patent No.: US 7,014,969 B2
(45) Date of Patent: Mar. 21, 2006

(54) SILICA FINE PARTICLE, TONER, TWO-COMPONENT DEVELOPER AND IMAGE FORMING METHOD

(75) Inventors: Shinya Yachi, Shizuoka (JP); Yushi Mikuriya, Shizuoka (JP); Katsuyuki Nonaka, Ibaraki (JP); Shuntaro Watanabe, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 10/676,463

(22) Filed: Oct. 2, 2003

(65) Prior Publication Data

US 2004/0110077 A1    Jun. 10, 2004

(30) Foreign Application Priority Data

Oct. 2, 2002    (JP) .............................. 2002-290526

(51) Int. Cl.
*G03G 9/08*    (2006.01)
(52) U.S. Cl. ................ 430/108.7; 430/108.6; 430/110.3; 430/137.15; 423/335
(58) Field of Classification Search ............. 430/108.7, 430/108.6, 110.3, 137.15; 423/335
See application file for complete search history.

(56) References Cited

U.S. PATENT DOCUMENTS

| | | | |
|---|---|---|---|
| 4,851,960 A | 7/1989 | Nakamura et al. | 361/225 |
| 5,066,982 A | 11/1991 | Hosoya et al. | 355/269 |
| 5,283,618 A | 2/1994 | Hosoya et al. | 355/269 |
| 5,294,964 A | 3/1994 | Oshiumi | 355/270 |
| 5,328,792 A | 7/1994 | Shigemori et al. | 430/106.6 |
| 5,695,902 A | 12/1997 | Mikuriya et al. | 430/110 |
| 5,733,235 A | 3/1998 | Waku et al. | 492/25 |
| 5,936,736 A | 8/1999 | Suzuki et al. | 356/375 |
| 6,077,635 A | 6/2000 | Okado et al. | 430/45 |
| 6,733,940 B1 * | 5/2004 | Terao et al. | 430/108.3 |

FOREIGN PATENT DOCUMENTS

| | | |
|---|---|---|
| EP | 0354310 | 2/1990 |
| JP | 36-10231 | 7/1961 |
| JP | 59-61842 | 4/1984 |
| JP | 63-149669 | 6/1988 |
| JP | 01-20587 | 1/1989 |
| JP | 2-51168 | 4/1990 |
| JP | 2-259784 | 10/1990 |
| JP | 4-50886 | 2/1992 |

(Continued)

OTHER PUBLICATIONS

Derwent Abstract for JP 59-53856, WP1 1984-116913/198419 (1984).

Primary Examiner—Mark A. Chapman
(74) Attorney, Agent, or Firm—Fitzpatrick, Cellar, Harper & Scinto

(57) ABSTRACT

The present invention provides a silica fine particle capable of preventing a charging member or an image bearing member from being contaminated with toner when the toner contains the particle and also capable of providing the toner with a stable developing property. The silica fine particle of the present invention has been hydrophobic treated. Furthermore, the particle has a peak in a range of 0.04 $\mu$m to 1 $\mu$m and a peak in the range of 1 $\mu$m to 100 $\mu$m in a volume-basis particle diameter distribution. The particle has a frequency ratio of 10 to 80% for the particles with a particle diameter of 0.04 $\mu$m to 1 $\mu$m to a total of all the peaks, and the particles has the frequency ratio of less than 16% for the particles with a particle diameters of 20 $\mu$m to 2000 $\mu$m to the total of all the peaks.

51 Claims, 7 Drawing Sheets

FOREIGN PATENT DOCUMENTS

| | | |
|---|---|---|
| JP | 4-204751 | 7/1992 |
| JP | 4-296766 | 10/1992 |
| JP | 5-2287 | 1/1993 |
| JP | 5-19662 | 1/1993 |
| JP | 5-69427 | 3/1993 |
| JP | 5-165378 | 7/1993 |
| JP | 5-188637 | 7/1993 |
| JP | 5-346682 | 12/1993 |
| JP | 6-313980 | 11/1994 |
| JP | 6-332235 | 12/1994 |
| JP | 7-92724 | 4/1995 |
| JP | 7-319201 | 12/1995 |
| JP | 8-292640 | 11/1996 |
| JP | 10-104501 | 4/1998 |
| JP | 11-38730 | 2/1999 |
| JP | 11-167250 | 6/1999 |
| JP | 11-174731 | 7/1999 |
| JP | 11-311890 | 11/1999 |

* cited by examiner

SILICA FINE PARTICLE, TONER, TWO-COMPONENT DEVELOPER AND IMAGE FORMING METHOD

BACKGROUND OF THE INVENTION

1. Field of the Invention

The present invention relates to a silica fine particle, toner, two-component developer and image forming method using the toner all of which can be suitably used to form and develop an electric latent image in electrophotography, static printing or toner jet method.

2. Description of the Related Art

A large number of methods have conventionally been known as electrophotography. In general, an electrostatically charged latent image is formed on a photosensitive member using a photoconductive substance by various units, the latent image is developed with a toner to form a toner image, and the toner image is transferred to a transfer material such as paper as required and is fixed on the transfer material by heat, pressure, both of them, or the like to obtain a copy or printed matter. Residual toner particles remaining on the photosensitive member without being transferred to the transfer material are removed from the photosensitive member by a cleaning step.

For the step of cleaning the photosensitive member, methods such as blade cleaning, fur brush cleaning, or roller cleaning have been employed. The above method is used to scrape off or check the transfer residual toner on the photosensitive member mechanically to collect the residual toner in a waste toner container. However, since a member used for cleaning is pressed against the surface of the photosensitive member, the surface of the photosensitive member is apt to wear away.

Since the apparatus is provided with a cleaning unit, the apparatus becomes bulky inevitably, which is an obstacle to the downsizing of the apparatus.

Further, a system which is free from the production of waste toner is desired from an ecological point of view.

For example, JP 5-69427 B proposes an image forming apparatus which employs a technology so called "developing/cleaning" or "cleaner-less". In the image forming apparatus, one image is formed each time the photosensitive member makes one revolution in order to prevent the transfer residual toner from affecting the same image. JP 64-20587 A, JP 2-259784 A, JP 4-50886 A and JP 5-165378 A propose that the transfer residual toner is scattered over a photosensitive member by a scattering member to prevent the formation of a pattern so that the transfer residual toner is hardly seen on an image even when the same surface of the photosensitive member is used several times for one image.

However, when a cleaner-less system is attained by preventing the formation of a pattern with the residual toner, a device for applying a voltage to a member for preventing the formation of a pattern is required, thereby making it difficult to downsize the whole apparatus.

JP 2-51168 A proposes to obtain stable charging properties by using a spherical toner or spherical carrier in a cleaner-less electrophotographic printing method. However, the publication is utterly silent about physical properties of the toner, particularly an external additive existent on the surface of the toner, which are the major factors of the fusion of the toner to a member or drum, or the like.

JP 5-2287 A proposes to obtain stable charging properties by setting the resistance and the amount of charge of a toner to appropriate values in a cleaner-less electrophotographic printing method. However, the publication is utterly silent about the physical properties of the toner, particularly an external additive existent on the surface of the toner.

Further, JP 6-250566 A, JP 8-292640 A, JP 11-38730 A and JP 11-311890 A propose various cleaner-less electrophotographic printing systems but the publications are utterly silent about a preferred external additive suitable for use in the cleaner-less systems.

As demand for obtaining high quality image from users is strong, the physical properties of a toner, particularly the form of an external additive existent on the surface of the toner are important from this point of view. JP 11-174731 A or the like proposes a toner having excellent development stability by specifying a particle diameter and form of an external additive. However, this application does not refer to a coarse particle contained in the silica fine particle used as the external additive. When the silica fine particle contains a large amount of the coarse particle, the problem of contamination of a roller or an image bearing member in the image forming comprising a charging roller as a charging member. Therefore, further improvement is required.

Various organic photoconductive materials have recently been developed as a photoconductive material for use in an electrophotographic photosensitive member. In particular, a function separation type organic photoconductive material including a charge generation layer and a charge transport layer has been implemented and used in copiers, printers, facsimiles, and the like. As a charging unit for those electrophotographic apparatuses, units making use of corona discharge have been used. However, when corona discharge is used, ozone is generated.

As technology for solving the above problem, there has been developed a charging method in which a charging member such as a roller or blade is contacted to the surface of a photosensitive member to form a narrow space in the vicinity of its contact portion in order to form discharge which can be interpreted by so-called "Paschen's law", thereby suppressing the generation of ozone as much as possible. Out of those, a roller charging method using a charging roller as the charging member is preferably used from the viewpoint of charging stability.

Since this charging is carried out by discharging from the charging member to a charged body, charging is started by applying a voltage equal to or higher than a certain threshold voltage. For example, when a charging roller is contacted to a photosensitive member having an about 25 $\mu$m-thick photosensitive layer and containing an organic photoconductive material, the surface potential of the photosensitive member starts to rise at a voltage equal to or higher than about 640 V and then increases linearly at an inclination of 1 based on an application voltage. This threshold voltage is hereinafter defined as a charge start voltage Vth. That is, to obtain the surface potential Vd of the photosensitive member, Vd+Vth, that is, a DC voltage equal to or higher than that required must be applied to the charging roller. Further, as the resistance value of the charging roller is changed by environmental variations, it has been difficult to control the potential of the photosensitive member to a desired value.

Therefore, in order to uniformize charge, as disclosed by JP 63-149669 A, for example, a DC+AC charging system is employed in which a voltage obtained by superimposing an AC voltage having an inter-peak value of 2×Vth or higher on a DC voltage equivalent to desired Vd is applied to a contact charging roller. This is aimed to achieve the effect of uniformizing potential by AC. The potential of a member to be charged converges to Vd at the center of the peak of the AC voltage and is hardly affected by an external disturbance such as environmental variations.

However, since an essential charging mechanism of this charging system makes use of a discharge phenomenon from a charging member to a photosensitive member, a voltage required for charging must be equal to or higher than the surface potential of the photosensitive member as described above. Further, the generation of vibration and noise (to be referred to as "AC charging sound" hereinafter) in the charging member and the photosensitive member caused by the electric field of an AC voltage and the deterioration of the surface of the photosensitive member by discharge become marked as new problems to be solved.

JP 5-19662 A proposes the use of a secondary particle obtained by fusing a primary polymer particle in a toner, JP 4-296766 A proposes the use of a polymerization toner which transmits exposure light for a photosensitive member, and JP 5-188637 A proposes the use of a toner having a specific volume average particle diameter, number average particle diameter, amount of charge, area ratio of its projection image, BET specific surface area, and the like. However, an excellent image forming method using a development/cleaning system is still desired.

When a "development/cleaning system" or "cleaner-less" technology is used, the transfer residual toner cuts off exposure light and interferes with the formation of an electrostatically charged latent image, thereby making it impossible to control the potential to a desired value, with the result of the formation of a negative memory on an image. Further, when there is a large amount of the transfer residual toner, the residual toner cannot be entirely collected in the development step and a positive memory is apt to be formed on the image. Even when a member for preventing the formation of a pattern is used, image quality tends to lower.

As for toner, it is generally known that inorganic fine particles having a small particle diameter are added externally to coloring particles (toner particles) in order to obtain excellent developability, cleanability and transferability by adjusting the charging properties, fluidity, or the like of the toner.

However, it has been confirmed that when the toner containing the above externally added inorganic fine particles each having a small particle diameter is used for a long time, the inorganic fine particles each having a small particle diameter are buried in the surface of the toner by stress from a carrier when the toner is used as a two-component developer, stress from a developer coating blade or developer supply roller when the toner is used as a one-component developer, or collision with an inner wall of a developing device or stirring blade, or between toners.

To prevent the inorganic fine particles each having a small particle diameter from being buried, a method making use of inorganic fine particles each having a large particle diameter is effective as disclosed by JP 4-204751 A, JP 5-346682 A, JP 6-313980 A, JP 6-332235 A and JP 7-92724 A.

The addition of inorganic fine particles each having a large particle diameter provides a so-called "spacer effect", so that direct contact between the surface of the toner having the inorganic fine particles each having a small particle diameter adhered thereto and a carrier, developer coating blade, developer supply roller, the inner wall of a developing device, stirring blade and another toner is prevented, thereby reducing stress. Therefore, the inorganic fine particles each having a small particle diameter are prevented from being buried and the service life of the toner is extended.

Further, to maintain this spacer effect, silica is preferably used as the inorganic fine particles each having a large particle diameter. The reason for this is as follows. The inorganic fine particles each having a large particle diameter have relatively lower electrostatic adhesion to the surface of a toner than that of the inorganic fine particles each having a small particle diameter. Therefore, the inorganic fine particles each having a large particle diameter are apt to be separated from the surface of the toner, consumed by development or the like and reduced in number, whereby its spacer effect tends not to last for a long time. Since silica has a larger amount of charge and higher adhesion to the surface of a toner than other inorganic materials, when silica is used as the inorganic fine particles each having a large particle diameter, separation can be suppressed and the spacer effect can be maintained.

However, a toner to which inorganic fine particles each having a small particle diameter and silica having a large particle diameter are externally added is apt to cause a so-called "charge-up" that charging properties become too high in a low-humidity environment. Thus, the toner has poor environmental stability.

Meanwhile, JP 7-104501 A proposes a toner which contains hydrophobic silica having a particle diameter of 15 to 20 nm, hydrophobic silica having a particle diameter of 13 nm or less, and alumina as external additives. Although this toner achieves excellent environmental characteristics in a two-component developer containing a carrier, the hydrophobic silica having a particle diameter of 15 to 20 nm separates from the surface of the toner in a non-magnetic one-component developer, thereby making it impossible to obtain a satisfactory spacer effect and promoting the silica to be buried in the surface of the toner. As a result, an increase in fogging, the occurrence of a cleaning failure and a reduction in transfer efficiency are seen. Also satisfactory environmental characteristics are not obtained, and a reduction in the density of an image caused by the charge-up and image nonuniformity are observed. Supposedly, this is because a mechanical stress from a blade which is a charging member is larger in non-magnetic one-component development than in two-component development.

The cleaning and preventing fusion of the photosensitive member are being improved by the physical properties of an external additive. The BET specific surface area of an inorganic fine particle has often been used as an index for the particle diameter of the inorganic fine particle. Although this method roughly indicates the size of a particle, it is difficult to know the size of a primary particle and the particle diameter of a particle of higher order, which is an agglomerate of primary particles, even when their specific surface areas are the same.

JP 7-319201 A and JP 11-167250 A also propose technology for adding silica having a specific particle diameter distribution to a toner externally. In those publications, the particle diameter distribution of the inorganic fine particles is measured by an aperture type particle diameter distribution meter. In this measurement method, the measurement range is so narrow that particles larger than the aperture diameter cannot be measured and particles each having a small particle diameter of about 1 $\mu$m or less cannot be measured owing to detection limits. Therefore, it is difficult to know the particle diameter, and further improvement in the control of a particle diameter distribution is required. It is noted that those publications are mainly aimed to control the amount of coarse particles.

In view of this, the development of a method for measuring the size of a particle and the degree of agglomeration and novel inorganic fine particles based on that measurement method is desired. JP 10-67510 A proposes silica having a particular specific surface area and discloses the particle diameter distribution of the silica but is utterly silent about the particle diameter distribution of fine particles each having a particle diameter of less than 1 μm.

SUMMARY OF THE INVENTION

It is an object of the present invention to provide a silica fine particle, toner, two-component developer and image forming method, which solve the above problems.

It is another object of the present invention to provide a toner which has excellent transferability, prevents the occurrence of fogging and is excellent in durability and stability even when the toner is used to continuously print a large number of copies, as well as an image forming method.

It is still another object of the present invention to provide a toner which rarely contaminates a charging roller, can form a clear image and is excellent in endurance stability even when the toner is used to continuously print a large number of copies, as well as an image forming method.

It is a further object of the present invention to provide a toner which hardly wears an image bearing member and is excellent in image density stability, as well as an image forming method.

Therefore, the present invention relates to a silica fine particle which is hydrophobic treated, and has a peak in a particle diameter range of 0.04 μm or more and less than 1 μm and a peak in the particle diameter range of 1 μm or more and less than 100 μm in a volume-basis particle diameter distribution on the basis of volume by a laser diffraction particle diameter distribution meter, in which the silica fine particle has a frequency ratio of 10 to 80% for the particles with a particle diameter in the range of 0.04 μm or more and less than 1 μm to a total of all the peaks, and has the frequency ratio of less than 16% for the particles with the particle diameter in the range of 20 μm or more and less than 2000 μm to the total of all the peaks, respected to the volume-basis particle diameter distribution.

Further, the present invention relates to a toner comprising a toner particle and an external additive, in which:

the toner particle has a weight average particle diameter of 4 to 9 μm; and the external additive contains at least a silica fine particle (A) which is hydrophobic treated, and has a peak in a range of 0.04 μm or more and less than 1 μm and a peak in the range of 1 μm or more and less than 100 μm in a volume-basis particle diameter distribution measured by using a laser diffraction particle diameter distribution meter, the silica fine particle (A) has a frequency ratio of 10 to 80% for the particles with the particle diameter in the range of 0.04 μm or more and less than 1 μm to a total of all the peaks, and has the frequency ratio of less than 16% for the particles with the particle diameter of 20 μm or more and less than 2000 μm to the total of all the peaks, respected to the volume-basis particle diameter distribution.

Further, the present invention relates to a two-component developer including the toner and a carrier.

Further, the present invention relates to an image forming method using an image forming apparatus comprising: an image bearing member; a charging unit charging a surface of the image bearing member; an information-writing unit forming an electrostatic latent image on the image bearing member being charged; a developing unit visualizing the electrostatic latent image with a toner; and a transfer unit transferring a visualized toner image to a transfer material directly or through an intermediate transfer member, in which:

the toner comprises at least a toner particle and an external additive, and the toner particle has a weight average particle diameter of 4 to 9 μm; and the external additive contains at least a silica fine particle (A) which is hydrophobic treated, and has a peak in a range of 0.04 μm or more and less than 1 μm and a peak in the range of 1 μm or more and less than 100 μm in a volume-basis particle diameter distribution measured by using a laser diffraction particle diameter distribution meter, the silica fine particle (A) has a frequency ratio of 10 to 80% for the particles with a particle diameter in the range of 0.04 μm or more and less than 1 μm to a total of all the peaks, and has the frequency ratio of less than 16% for the particles with the particle diameter of 20 μm or more and less than 2000 μm to the total of all the peaks, respected to the volume-basis particle diameter distribution.

BRIEF DESCRIPTION OF THE DRAWINGS

Other objects and advantages of the present invention will become apparent during the following discussion conjunction with the accompanying drawings, in which.

DETAILED DESCRIPTION OF THE INVENTION

Figure 1:
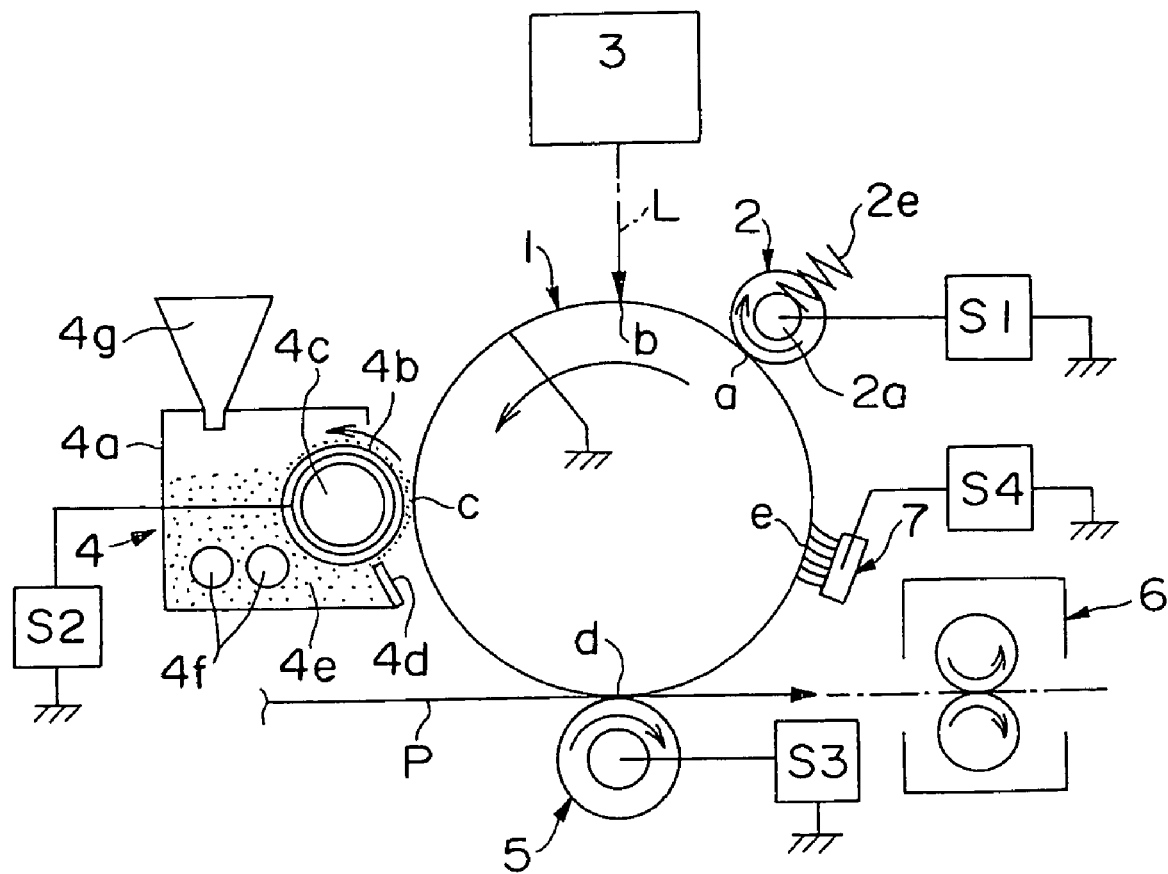
FIG. 1 is a schematic diagram showing an example of an image forming apparatus to which the present invention can be applied.

When there is a member such as a charging roller which is in pressure contact with an electrographic photosensitive drum, as its durable use continues longer, the member or the drum may be contaminated or worn away, or the toner may be adhered or fused to the surface of the drum or the surface of the roller.

To solve the above problem, the inventors of the present invention have conducted intensive studies and have found that the contamination of the member or the photosensitive drum and damage to those members can be reduced by controlling the particle diameter of an external additive, which is external added to the surface of a toner particle, to achieve a predetermined distribution and further by hydrophobic treating of the external additive.

The inventors have succeeded to prevent the transfer residual toner from adhering (being anchored) to the surface of a charging roller and to the surface of a drum by adjusting surface hardness of the charging roller to a predetermined range and specifying the structure and molecular weight of the surface layer of the photosensitive member. The inventors further have been succeeded to prevent generation of an image defect caused by the contamination of a charging roller and generation of a transfer failure image caused by the defect by reducing toner damage at a nip portion between the charging roller and the photosensitive drum.

A description is first given of the silica fine particles (silica fine particles (A)), and a toner and a two-component developer containing the silica fine particles of the present invention.

The silica fine particles (silica fine particles (A)) of the present invention have been hydrophobic treated and have a peak in a particle diameter range of 0.04 $\mu$m or more and less than 1 $\mu$m and a peak at a particle diameter range of 1 $\mu$m or more and less than 100 $\mu$m in a volume-basis particle diameter distribution measured by using a laser diffraction particle diameter distribution meter. The frequency ratio of the particles with a particle diameter in the range of 0.04 $\mu$m or more and less than 1 $\mu$m to a total of all the peaks is 10 to 80%, and the frequency ratio of the particle with a particle diameter in the range of 20 $\mu$m or more and less than 2,000 $\mu$m to the total of all the peaks is less than 16%. When a toner contains the silica fine particles, the contamination of a charging member and an image bearing member (photosensitive member) can be prevented, thereby making it possible to provide stable developing property.

More preferably, the frequency ratio of the particle with a particle diameter in the range of 0.04 $\mu$m or more and less than 1 $\mu$m to the total of all the peaks is 20% to 70%, and the frequency ratio of the particle with a particle diameter in the range of 20 $\mu$m or more and less than 2,000 $\mu$m to the total of all the peaks is less than 12%. When the frequencies are in above more preferably range, the above effect is further improved.

The method of measuring the volume-basis particle diameter distribution by using a laser diffraction particle diameter distribution meter in the present invention will be described hereinbelow.

The particle diameters of the silica fine particles (silica fine particles (A)) are measured with Coulter LS-230 laser diffraction particle diameter distribution meter (manufactured by Coulter Co., Ltd.). Ethanol is used as a mesuring solvent. A measurement system of the particle diameter distribution meter is cleaned and substituted with ethanol for several times to carry out a background function.

A sample liquid is obtained as will be described below and is added gradually to the measuring system of the above measuring instrument in order to adjust the concentration of the sample in the measuring system so that PIDS (concentration) on the screen of the instrument becomes 45 to 55% and to obtain a frequency ratio from a particle diameter distribution calculated from a volume-basis distribution.

As device factors, measurement is performed based on the assumption that a refractive index of ethanol is 1.36 and a refractive index of an optical model is 1.08 (real part)–0.00i (imaginary part). The particle diameter measurement range of the Coulter LS-230 laser diffraction particle diameter distribution meter in the present invention is 0.04 to 2,000 $\mu$m. The measurement temperature is in the range of 20 to 25° C.

The sample liquid in the present invention is prepared as follows. 0.4 g of fine particles to be measured is weighed, added to a beaker containing 100 ml of ethyl alcohol, and the mixture is stirred with a stirrer for 1 minute to be dissolved. In case that particle diameter of the fine particles to be measured is very fine or a degree of cohesion of the particles is small, 0.2 g of fine particles and 50 ml of ethyl alcohol may be used for the sample liquid. The beaker is transferred to an ultrasonic vibration tank so as to disperse the fine particles for 3 minutes. This dispersed liquid is used as a sample liquid and when the dispersion is completed, the dispersed liquid is immediately added to a measuring portion of the measuring instrument, which is filled with ethanol, until the concentration of the sample will reach a measurement allowable value to start measurement.

ULTRASONIC CLEANER VS-150 manufactured by Inoue Seieido Co., Ltd. (frequency of 50 kHz, maximum output of 150 W) is used as the ultrasonic vibration tank in the present invention.

The concentration of the sample respect to the measurement is preferable to observe cohesiveness and dispersion of fine particles, and is a concentration with which a particle diameter distribution of the fine particles can be exactly measured.

On measuring the particle diameter distribution with the Coulter LS-230 laser diffraction particle diameter distribution meter, first diameters of each particle are measured, and then the values are divided into channels shown in Table 1 as follows. The central values of each of the channels are defined as a representative value and spheres having diameters equal to the representative values are assumed. The volume-basis particle diameter distribution is calculated on the basis of volumes of the spheres.

TABLE 1

| Particle diameter ($\mu$m) |
|---|
| 0.040 or more and less than 0.044 |
| 0.044–0.048 |
| 0.048–0.053 |
| 0.053–0.058 |
| 0.058–0.064 |
| 0.064–0.070 |
| 0.070–0.077 |
| 0.077–0.084 |
| 0.084–0.093 |
| 0.093–0.102 |
| 0.102–0.112 |
| 0.112–0.122 |
| 0.122–0.134 |
| 0.134–0.148 |
| 0.148–0.162 |
| 0.162–0.178 |
| 0.178–0.195 |
| 0.195–0.214 |
| 0.214–0.235 |
| 0.235–0.258 |
| 0.258–0.284 |
| 0.284–0.311 |
| 0.311–0.342 |
| 0.342–0.375 |
| 0.375–0.412 |
| 0.412–0.452 |
| 0.452–0.496 |
| 0.496–0.545 |
| 0.545–0.598 |
| 0.598–0.657 |

TABLE 1-continued

| Particle diameter (μm) |
|---|
| 0.657–0.721 |
| 0.721–0.791 |
| 0.791–0.869 |
| 0.869–0.953 |
| 0.953–1.047 |
| 1.047–1.149 |
| 1.149–1.261 |
| 1.261–1.385 |
| 1.385–1.520 |
| 1.520–1.669 |
| 1.669–1.832 |
| 1.832–2.010 |
| 2.010–2.207 |
| 2.207–2.423 |
| 2.423–2.660 |
| 2.660–2.920 |
| 2.920–3.206 |
| 3.206–3.519 |
| 3.519–3.862 |
| 3.862–4.241 |
| 4.241–4.656 |
| 4.656–5.111 |
| 5.111–5.611 |
| 5.611–6.158 |
| 6.158–6.761 |
| 6.761–7.421 |
| 7.421–8.147 |
| 8.147–8.944 |
| 8.944–9.819 |
| 9.819–10.78 |
| 10.78–11.83 |
| 11.83–12.99 |
| 12.99–14.26 |
| 14.26–15.65 |
| 15.65–17.18 |
| 17.18–18.86 |
| 18.86–20.70 |
| 20.70–22.73 |
| 22.73–24.95 |
| 24.95–27.38 |
| 27.38–30.07 |
| 30.07–33.00 |
| 33.00–36.24 |
| 36.24–39.77 |
| 39.77–43.66 |
| 43.66–47.93 |
| 47.93–52.63 |
| 52.63–57.77 |
| 57.77–63.41 |
| 63.41–69.62 |
| 69.62–76.43 |
| 76.43–83.90 |
| 83.90–92.09 |
| 92.09–101.1 |
| 101.1–111.0 |
| 111.0–121.8 |
| 121.8–133.7 |
| 133.7–146.8 |
| 146.8–161.2 |
| 161.2–176.8 |
| 176.8–194.2 |
| 194.2–213.2 |
| 213.2–234.1 |
| 234.1–256.8 |
| 256.8–282.1 |
| 282.1–309.6 |
| 309.6–339.8 |
| 339.8–373.1 |
| 373.1–409.6 |
| 409.6–449.7 |
| 449.7–493.6 |
| 493.6–541.9 |
| 541.9–594.9 |
| 594.9–653.0 |
| 653.0–716.9 |
| 716.9–786.9 |
| 786.9–863.9 |
| 863.9–948.2 |
| 948.2–1041 |
| 1041–1143 |
| 1143–1255 |
| 1255–1377 |
| 1377–1512 |
| 1512–1660 |
| 1660–1822 |
| 1822–2000 |

First of all, in the present invention, the frequency ratio of the particles with a particle diameter of 0.04 μm or more and less than 1 μm to the total of all the peaks must be 10 to 80%. This particle diameter range of 0.04 μm or more and less than 1 μm is slightly smaller than the particle diameter of a toner particle and this particle diameter range is required to prevent deterioration of toner in durability caused by an external additive buried in the surface of the toner particle or to improve the transfer efficiency of the toner.

When the frequency ratio of the particles with a particle diameter range of 0.04 μm or more and less than 1 μm to the total of all the peaks is less than 10%, the transferability of the toner may lower and a satisfactory image may be not obtained. The inorganic fine particles used in combination are buried in the surface of the toner particle and an image is deteriorated by a reduction in fluidity of toner.

When the frequency ratio of the particles with a particle diameter range of 0.04 μm or more and less than 1 μm to the total of all the peaks is more than 80%, the amount of silica fine particles which separate from the surface of the toner particles and adhere to the charging member, the developing member, or the photosensitive drum, thereby an image defect may be caused.

When the frequency ratio of the particles with a particle diameter range of 0.04 μm or more and less than 1 μm to the total of all the peaks is 20 to 70%, the above effect is further improved.

Further, in the present invention, the frequency ratio of the particles with a particle diameter range of 20 μm or more and less than 2,000 μm to the total of all the peaks must be less than 16%. The particle diameter range of 20 μm or more and less than 2,000 μm is larger than that of the toner particle and is equal to or smaller than an opening of a sieve for removing coarse particles after the external addition treatment.

When the frequency ratio of the particles with a particle diameter range of 20 μm or more and less than 2,000 μm to the total of all the peaks is 16% or more, the silica fine particles are apt to adhere to the charging member, developing member, and photosensitive drum, thereby causing an image defect.

When the frequency ratio of the particles with a particle diameter range of 20 μm or more and less than 2,000 μm to the total of all the peaks is less than 12%, the above effect is further improved.

The silica fine particles (silica fine particles (A)) of the present invention must have a peak in a particle diameter range of 0.04 μm or more and less than 1 μm. When the silica fine particles have a peak in this range, the effect of improving a transferability of the toner and preventing an external additive from being buried in the surface of the toner particle can be obtained. In contrast, when the silica fine particles do not have a peak at that range, an image may be rough caused by inferior transferring at the latter term in durability printing.

Further, the silica fine particles (silica fine particles (A)) of the present invention must have a peak in a particle diameter range of 1 μm or more and less than 100 μm. When the silica fine particles do not have a peak in this range, the toner or developer tends to be densely packed, thereby accelerating the deterioration of the toner or the developer.

In the present invention, a half-value width of the maximum peak present in a particle diameter range of 1 μm or more and less than 100 μm is preferably 5 to 25 μm. When this half-value width is smaller than 5 μm, the toner or the developer tend to be densely packed, thereby accelerating the deterioration of the toner or the developer.

When the half-value width of the maximum peak present in a particle diameter range of 1 μm or more and less than 100 μm is larger than 25 μm, more coarse particles are existent and adhere to the charging member, developing member, and photosensitive drum, thereby causing an image defect.

The half-value width of the maximum peak present in a particle diameter range of 1 μm or more and less than 100 μm is more preferably 8 to 20 μm.

The silica fine particles (silica fine particles (A)) of the present invention have a volume average particle diameter with respect to the volume-basis particle diameter distribution measured by using a laser diffraction particle diameter distribution meter of preferably 0.1 to 20 μm, more preferably 0.3 to 12 μm.

When the volume average particle diameter is smaller than 0.1 μm, the number of particles having a spacer effect may decreases, transferability may lowers, and the toner and the developer tend to be densely packed, thereby accelerating the deterioration of the developer.

A number average length of primary particles of the silica fine particles (silica fine particles (A)) of the present invention is preferably 18 to 200 nm, more preferably 20 to 100 nm. The method for the measurement of the length of primary particles will be described later.

As above described, the silica fine particles (silica fine particles (A)) of the present invention have peaks respectively in the two different particle diameter range. It is preferable that the particle diameter distribution of the silica fine particles according to the present invention is obtained by forming composite particles with a plurality of the primary particles having the above length. Including the composite particles in the silica fine particles can provide the particles with a function as a spacer particle, thereby improvement of transferability and preventing deterioration of the toner can be satisfactorily achieved Although it is difficult to know the size of each silica fine particle (silica fine particle (A)) from its specific surface area measured by nitrogen adsorption in accordance with a BET method, the degree of water adsorption and the degree of charging site are changed by the surface area. Therefore the surface area must be controlled.

When the specific surface area measured by nitrogen adsorption in accordance with the BET method of the silica fine particle (silica fine particle (A)) is 30 to 100 m²/g, developing properties become excellent.

When the specific surface area measured by nitrogen adsorption in accordance with the BET method of the silica fine particle (silica fine particle (A)) is smaller than 30 m²/g, it is considered that cohesiveness becomes too high and composite particles may become too large, and the particles tend to separate from the toner particle and contaminate the members of the image forming apparatus.

When the specific surface area measured by nitrogen adsorption in accordance with the BET method of the silica fine particle (silica fine particle (A)) is larger than 100 m²/g, it is considered that composite particles in the present invention are hardly formed, thereby making it difficult to obtain the effect of the present invention.

When the addition amount of the silica fine particles (silica fine particles (A)) of the present invention to be added to the toner is 0.05 to 1.0 part by mass with respect to 100 parts by mass of the toner particles, the excellent transferring can achieved if the toner is applied to an image forming apparatus having intermediate transfer member, in which two transferring processes are performed, and excellent image can be formed.

When the addition amount of the silica fine particles (silica fine particles (A)) is smaller than 0.05 part by mass, transferability deteriorates and the spacer effect is hardly obtained, whereby the silica fine particles and the other fine particles used in combination with the silica fine particles are buried in the toner particles and developability lowers.

When the addition amount of the silica fine particles is larger than 1.0 part by mass, the silica fine particles tend to separate from the toner particle and to contaminate the members of the image forming apparatus.

In the present invention, the BET specific surface area of each particle is measured by using AUTOSOBE 1 specific surface area meter manufactured by QUANTACHROME as follows.

About 0.1 g of a measurement sample is weighed in a cell and deaerated at a temperature of 40° C., a vacuum degree of $1.0 \times 10^{-3}$ mmHg for 12 hours or more. After that, a nitrogen gas is adsorbed to the sample while the sample is cooled by liquid nitrogen to obtain its BET specific surface area by a multi-point method.

In the present invention, it is preferred that at least one type of fine particles (B) having a smaller number average length of primary particle diameter than that of the silica fine particles (A) is incorporated in addition to the silica fine particles (silica fine particles (A)). Particles finer than the silica fine particles (A) uniformize charge on the surface of the toner to achieve a sharp charge quantity distribution of the toner, and improve the fluidity of the toner.

The number average length of the primary particle of the fine particles (B) is preferably 1 to 50 nm. This range is ideal for uniformizing charge on the surface of the toner to achieve the sharp charge quantity distribution of the toner and improving the fluidity of the toner.

The measurement of the number average lengths of the primary particle of the silica fine particle (A) and the fine particle (B) are carried out by photographing the surface of each toner particle at a magnification of ×500,000 with FE-SEM scanning electron microscope (S-4700 manufactured by Hitachi, Ltd.) and measuring from the magnified photo.

The number average length of the primary particle is measured in 10 fields of view in the magnified photo and the average value of the obtained measurement data is taken as an number average length. The longest distance between parallel lines out of parallel lines drawn to contact an outline of the primary particle of the fine particle is regarded as a length of the primary particle.

When the number average length of the primary particle of the fine particles (B) is smaller than 1 nm, the fine particles (B) are buried in the surface of the toner particle, thereby causing the deterioration of the toner after long-term use.

When the number average length of the primary particle of the fine particles (B) is larger than 50 nm, charge on the surface of the toner particle is difficuly be uniformalized sufficiently, and the charge quantity distribution of the toner mays becomes broad, whereby the scattering of the toner, fogging, and the like tend to occur. Since the particle diameter of the silica fine particles (B) is large, it is difficult to cover the surface of the toner uniformly and to obtain the effect of the present invention.

When the specific surface area (BET specific surface area) measured by nitrogen adsorption in accordance with the BET method of the fine particles (B) is 100 to 200 m$^2$/g, the developing properties of the image forming apparatus according to the present invention become excellent.

When the BET specific surface area of the fine particles (B) is smaller than 100 m$^2$/g, the cohesiveness of the particles becomes too high and uniform charging properties are hardly obtained.

When the BET specific surface area of the fine particles (B) is larger than 200 m$^2$/g, the amount of water adsorbed to the fine particles increases and a triboelectricity difference between high humidity and low humidity is apt to be large.

Further, when the addition amount of the fine particles (B) is 0.1 to 2.0 parts by mass with respect to 100 parts by mass of the toner particles, fluidity of the developer becomes excellent and the effect of improving of the transferability and preventing the charge-up of the toner at a low humidity can be obtained.

When the amount of the fine particles (B) to be added is smaller than 0.1 part by mass, the fluidity of the toner deteriorates, developability and transferability worsen, and the dispersion of another external additive becomes nonuniform, resulting in worsened fogging. When the amount of the fine particles (B) to be added is larger than 2.0 parts by mass, the amount of the fine particles existent on the surface of the toner particles increases, thereby contaminating the members of the image forming apparatus or impeding the fixing of the toner.

Unlike using a corona charging system or magnetic brush charging system, in an image forming apparatus using a roller charging system, a charging roller and an image bearing member turn while they are in contact with each other at a certain pressure. In this case, the fusion of the toner and the external additive to the charging roller or the image bearing member tends to occur. In particular, in a cleanerless system without a cleaning blade, because the transfer residual toner passes through a nip between the charging roller and the image bearing member, the fusion of the toner and the external additive occurs more easily. Even in this case, the contamination of the members by the toner and the external additive can be prevented because the silica fine particles (silica fine particles (A)) of the present invention have been hydrophobic treated. The silica fine particles (A) of the present invention have been hydrophobic treated preferably with a silane coupling agent or silicone oil, more preferably with both of them.

Although hydrophobic treatment may be carried out using fluorine oil or various types of modified oil, silicone oil is preferably used in the present invention.

Examples of the silicone oil include a compound represented by the following general formula

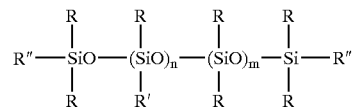

(where R denotes an alkyl group of C1 to 3, R' denotes an alkyl group of C1 to 3, a halogen modified alkyl group, a phenyl group, a modified phenyl group having an alkyl group of C1 to 3, or a halogen modified phenyl group, and R" denotes an alkyl group of C1 to 3 or an alkoxy group).

Examples of the silicone oil represented by the above general formula include dimethyl silicone oil, alkyl modified silicone oil, α-methylstyrene modified silicone oil, chlorophenyl silicone oil, and fluorine modified silicone oil. Preferably, the above silicone oils having a viscosity of 50 to 100 mm$^2$/s at 25 C are used.

When the amount of the oil used for treating the silica fine particles (silica fine particles (A)) of the present invention is 3 to 35 parts by mass with respect to 100 parts by mass of the base material of the fine particles (that is, silica fine particles before the treatment), adhesion of the developer to the members of the image forming apparatus can prevented and the effect of improving of the transferability can obtained.

When the amount of the oil used for treating the silica fine particles (silica fine particles (A)) is smaller than 3 parts by mass, the effect of preventing the contamination of the members is hardly developed.

When the amount of the oil used for treating the silica fine particles (silica fine particles (A)) is larger than 35 parts by mass, the treated fine particles (A) readily cohere, thereby making the charging properties and developing properties of the toner nonuniform.

In the case of the present invention, when the amount of the oil used for treating the silica fine particles (A) is 5 to 25 parts by mass, the above-mentioned effects can be further increased.

The silica fine particles (silica fine particles (A)) may be classified and/or crashed in order to control the amount of composite particles each having a particle diameter of 0.1 μm or more and less than 1 μm and composite particles each having a particle diameter of 20 μm or more and less than 100 μm required in the present invention.

Examples of means of the above classification and cracking include: an air classifier for selecting particle diameter; means of disintegrating composite particles by an impact produced by the revolution of a rotor (hybritizer, cosmomizer, etc.); and a pin mill or jet mill for milling. Namely, it is important to control the particle diameter distribution of silica fine particles so that the particles get into the state specified by the present invention, and the apparatus is not particularly limited if the particle diameter distribution can be controlled.

Although conventionally known fine particles may be used as the fine particles (B) used in the present invention, the particles are preferably selected from the group consisting of silica fine particles, alumina fine particles, titanium oxide fine particles, zirconium oxide fine particles, magnesium oxide fine particles, and composite fine particles thereof to improve developability, fluidity, and storage properties of the toner.

Dry silica called "fumed silica" which is produced by vapor phase oxidation of a silicon halide or alkoxide and wet silica produced from an alkoxide or water glass may be used as silica. Dry silica which has a small number of silanol groups existent on the surface of or inside the fine particle and the quantity of residues in the manufacturing are small is preferred.

In the present invention, the fine particles (B) may be treated with a silane coupling agent or silicone oil or may be surface treated for forming an alumina film in order to enhance their hydrophobic property and improve the controllability of their particle diameters and shapes. In the present invention, the fine particles (B) are particularly preferably silica fine particles treated with silicone oil, titanium oxide fine particles treated with a silane coupling agent, or a combination of these.

Specifically, examples of the silane coupling agent include hexamethyldisilazane or a compound represented by the following general formula (1).

$$R_m SiY_n \qquad (1)$$

(where R denotes an alkoxy group or a chlorine atom; m denotes an integer of 1 to 3; Y denotes a hydrocarbon group including an alkyl group, a vinyl group, a glycidoxy group, or a methacryl group; and n denotes an integer of 1 to 3).

Examples of the compounds represented by the above formula (1) include, dimethyldichlorosilane, trimethylchlorosilane, allyldimethylchlorosilane, allylphenyldichlorosilane, benzyldimethylchlorosilane, vinyltriethoxysilane, γ-methacryloxypropyltrimethoxysilane, isobutyltrimethoxysilane, n-butyltrimethoxysilane, vinyltriacetoxysilane, divinylchlorosilane, and dimethylvinylchlorosilane.

A dry method in which the fine particles are made cloudy by agitation and reacted with a gasified silane coupling agent, or a wet method in which the fine particles are dispersed in a solvent and a silane coupling agent is added dropwise to be reacted with the dispersed solvent may be used to treat the fine particles with a silane coupling agent.

When the fine particles are treated with silicone oil, silicone oil which has been described as a treating agent for the silica fine particles (A) may be used.

To form an alumina coating film on the surface of each silica fine particle (B), a method in which aluminum chloride, aluminum nitrate, aluminum sulfate or the like is added to an aqueous solution or solvent and the fine particles are immersed in the obtained solution and dried, or a method in which hydrous alumina, hydrous alumina-silica, hydrous alumina-titanium oxide, hydrous alumina-titanium oxide-silica, or hydrous alumina-titanium oxide-silica-zinc oxide is added is added to an aqueous solution and the fine particles are immersed in the resulting aqueous solution and dried may be employed.

Fine particles may be further added to control the amount of charge and assist fluidity of the toner in addition to the fine particles (silica fine particles (A) and fine particles (B)) used in the present invention.

Examples of the fluidity providing agent includes metallic oxides (alumina, titanium oxide, etc.), carbon black, and silica, and of those hydrophobic treated are more preferable. Examples of the abrasive include metallic oxides (strontium titanate, cerium dioxide, alumina, magnesium oxide, chromium oxide, etc.), nitrides (silicon nitride, etc.), carbides (silicon carbide, etc.), and metallic salts (calcium carbonate, barium sulfate, calcium sulfate, etc.). Examples of the charge controlling particles include metallic oxides (tin oxide, titanium oxide, zinc oxide, silica, alumina, etc.), and carbon black.

In the present invention, in the circularity distribution of the toner particles, measured by a flow type particle image analyzer, the average circularity is preferably 0.950 to 0.995.

The flow type particle image analyzer is an apparatus for carrying out an analysis of an image of each particle statistically and the average circularity is calculated by arithmetically averaging circularities obtained from the following expression using the above apparatus.

Circularity=(length of circumference of equivalent circle)/(length of circumference of projection image of particle)

In the above expression, the length of the circumference of a projection image of a particle is a length of an outline obtained by connecting edge points of a binarized image of the particle, and the length of the circumference of an equivalent circle is the length of the circumference of a circle having the same area as that of the binarized image of the particle.

In the present invention, FPIA-1000 (manufactured by Toa Medical Electronics Co., Ltd.) is used as the flow type particle image analyzer.

As for the measurement method, 0.02 g of a measurement sample is added to 10 ml of a solution (20° C.) prepared by adding 0.1 to 0.5% by mass of a surfactant (preferably the Contaminon manufactured by Wako Junyaku Co., Ltd.) to ion exchange water and uniformly dispersed in the solution to prepare a sample dispersion. UM-50 ultrasonic disperser manufactured by SMT Co., Ltd. (transducer is a titanium alloy chip having a diameter of 5 mm) is used as a dispersion means, the dispersion time is 5 minutes, and a dispersant is cooled to keep its temperature lower than 40° C. As for measurement, the particle diameter range of 0.60 to 400 μm is divided into 226 channels. However, the actual measurement was carried out at equivalent circule diameter of 0.60 μm or more and less than 159.21 μm.

When the average circularity of the toner particles is 0.950 to 0.995, the shape of the toner is almost spherical. Accordingly, the transfer residual toner is small in quantity, and a load in charging by the roller and collection by the developer is small when it is applied to an image forming apparatus adopting a cleanerless system (a cleaning-simultaneous-with developing system), thereby providing good results. The average circularity is preferably 0.960 to 0.995, whereby the above effect is improved.

When the average circularity is lower than 0.950, the transfer residual toner becomes large in quantity and tends to be fused to the charging roller.

Examples of a low softening point substance which may be incorporated in the toner of the present invention include: paraffin wax, polyolefin wax, or modified products thereof (such as oxides and graft treated products); higher fatty acids and metal salts thereof; amide wax; ketone wax; and ester wax. When the low softening point substance is used in a color toner, if its crystallinity is high, the substance prevents the transmission of OHP on which the image is formed with the toner. Therefore, amide wax and ester wax are preferred.

The low softening point substance is used in an amount of 1 to 35 parts by mass, preferably 5 to 30 parts by mass based on 100 parts by mass of the binder resin.

The following binder resins may be used in the toner of the present invention.

Examples of the binder resin include monopolymers of styrene and substituents thereof such as polystyrene, polyp-chlorostyrene, and polyvinyltoluene; styrene copolymers such as a styrene/p-chlorostyrene copolymer, a styrene/vinyltoluene copolymer, a styrene/vinylnaphthalene copolymer, a styrene/acrylate copolymer, a styrene/methacrylate copolymer, a styrene-α-methyl chloromethacrylate copolymer, a styrene/acrylonitrile copolymer, a styrene/vinyl methyl ether copolymer, a styrene/vinyl ethyl ether copolymer, a styrene/vinyl methyl ketone copolymer, a styrene/butadiene copolymer, a styrene/isoprene copolymer, and a styrene/acrylonitrile/indene copolymer; polyvinyl chloride; a phenolic resin; a naturally modified phenolic resin; a naturally modified maleic resin; an acrylic resin; a methacrylic resin; polyvinyl acetate; a silicon resin; a polyester resin; polyurethane; a polyamide resin; a furan resin; an epoxy resin; a xylene resin; polyvinylbutyral; a terpene resin; a coumarone-indene resin; and a petroleum resin. As a binder material, styrene type copolymers and polyester resins are preferable.

Examples of comonomers for styrene monomer of the styrene copolymer include monocarboxylic acids each having a double bond and substituents thereof such as acrylic acid, methyl acrylate, ethyl acrylate, butyl acrylate, dodecyl acrylate, octyl acrylate, 2-ethylhexyl acrylate, phenyl acrylate, methacrylic acid, methyl methacrylate, ethyl methacrylate, butyl methacrylate, octyl methacrylate, acrylonitrile, methacrylonitrile, and acrylamide; dicarboxylates each having a double bond and substituents thereof such as maleic acid, butyl maleate, methyl maleate, and dimethyl maleate; vinyl esters such as vinyl chloride, vinyl acetate, and vinyl benzoate; ethylene olefins such as ethylene, propylene, and butylene; vinyl ketones such as vinyl methyl ketone and vinyl hexyl ketone; and vinyl ethers such as vinyl methyl ether, vinyl ethyl ether, and vinyl isobutyl ether. Those vinyl monomers may be used singly or in combination of two or more monomers.

The styrene polymers or styrene copolymers may be cross-linked and may be a mixed resin of a cross-linked resin and a non cross-linked resin.

As the crosslinking agent of the fixing resin, a compound that mainly has two or more polymerizable double bonds may be used. For example, aromatic divinyl compounds such as divinylbenzene and divinylnaphthalene; carboxylates having two double bonds such as ethylene glycol diacrylate, ethylene glycol dimethacrylate, and 1,3-butanediol dimethacrylate; divinyl compounds such as divinylaniline, divinyl ether, divinyl sulfide, and divinyl sulfone; and compounds having three or more vinyl groups, which may be used individually or in combination.

The addition amount of the crosslinking agent is preferably 0.001 to 10 parts by mass with respect to 100 parts by mass of the polymerizable monomer.

The toner of the present invention may contain a charge control agent.

The following substances control the toner to be negatively charged.

For example, an organometallic compound and a chelate compound are effective, which include a monoazo metal compound, an acetylacetone metal compound, and metal compounds of an aromatic hydroxycarboxylic acid and an aromatic dicarboxylic acid. In addition, an aromatic hydroxycarboxylic acid, an aromatic monocarboxylic acid, and an aromatic polycarboxylic acid, and metal salts thereof, anhydrides thereof, and esters thereof, and phenol derivatives thereof such as bisphenol are exemplified. Further, urea derivatives, metal-containing salicylic acid compounds, metal-containing naphthoic acid compounds, boron compounds, quaternary ammonium salts, calixarene, silicon compounds, styrene/acrylic copolymers, styrene/methacrylic copolymers, styrene/acrylic/sulfonic copolymers, and nonmetal carboxylate copolymers. Further, a resin into which the above-mentioned charge controlling substances are introduced may be incorporated into the toner.

Examples of the substance that controls the toner to positive charge are given below.

Examples include nigrosine and nigrosine modified with metal salt of fatty acid; quaternary ammonium salt such as guanidine compounds, tributylbenzylammonium-1-hydroxy-4-naphthosulfonate or tetrabutylammonium tetrafluoroborate, and an onium salt such as phosphonium salt which is an analog thereof, and a lake pigment thereof; a triphenylmethane dye and a lake pigment thereof (examples of an agent forming a lake pigment include phosphotungstate, phosphomolybdate, phosphotungusten molybdate, tannic acid, lauric acid, gallic acid, ferricyanide, and ferrocyanide); a metal salt of higher fatty acids; diorganotin oxides such as dibutyltin oxide, dioctyltin oxide, and dicyclohexyltin oxide; diorganotin borates such as dibutyltin borate, dioctyltin borate, and dicyclohexyltin borate which may be used singly or in combination of two or more compounds. Of those, a charge controlling agent such as a nigrosine type and quaternary ammonium salt are particularly preferably used. Further, a resin into which the above-mentioned charge controlling substances are introduced may be incorporated into the toner.

The charge control agent is preferably used in an amount of 0.01 to 20 parts by mass (more preferably 0.5 to 10 parts by mass) with respect to 100 parts by mass of the binder resin.

As for the colorant used in the present invention, carbon black, grafted carbon, and the following yellow/magenta/cyan colorants are used as a black colorant for coloring the toner black.

As the yellow colorants, there may be used compounds as represented by condensed azo compounds, isoindolinone compounds, anthraquinone compounds, azo metal complexes, methine compounds, and allylamide compounds. Specifically, C.I. Pigment Yellow 3, 7, 10, 12, 13, 14, 15, 17, 23, 24, 60, 62, 74, 75, 83, 93, 94, 95, 99, 100, 101, 104, 108, 109, 110, 111, 117, 123, 128, 129, 138, 139, 147, 148, 150, 166, 168, 169, 177, 179, 180, 181, 183, 185, 191, 192, 170, 199, etc. are suitably used.

Further, as the dye, C.I. Solvent Yellow 33, 56, 79, 82, 93, 112, 162, 163, C.I. Disperse Yellow 42, 64, 201, 211, etc. can be given.

Further, the yellow pigment and dye may optionally be used independently, or a combination of various pigments and dyes may be used.

As the magenta colorant, there may be used condensed azo compounds, diketopyrrolopyrrole compounds, anthraquinone, quinacridone compounds, basic dye lake compounds, naphthol compounds, benzimidazolone compounds, thioindigo compounds, and perylene compounds. Specifically, C.I. Pigment Red 2, 3, 5, 6, 7, 23, 48:2, 48:3, 48:4, 57:1, 81:1, 122, 146, 150, 166, 169, 177, 184, 185, 202, 206, 220, 221, 238, 254, C.I. Pigment Violet 19, etc. are particularly preferable.

Further, the magenta pigment and dye may optionally be used independently, or a combination of various pigments and dyes may be used.

As the cyan colorant, there may be used copper phthalocyanine compounds and derivatives thereof, anthraquinone compounds, basic dye lake compounds, and the like. Specifically, C.I. Pigment Blue 1, 7, 15, 15:1, 15:2, 15:3, 15:4, 60, 62, 66, etc. are particularly suitably used.

Further, the cyan pigment and dye may optionally be used independently, or a combination of various pigments and dyes may be used.

Those colorants may be used independently or in combination of two or more, and may be used as a solid solution. The colorant of the present invention may be selected on the basis of hue angle, saturation, lightness, weather resistance, OHP transparency, and dispersibility to the toner. The addition amount of the above colorant may be in the range of 1 to 20 parts by mass with respect to 100 parts by mass of the binder resin.

A description is subsequently given of the method of producing a toner used in the present invention. The toner used in the present invention can be produced by using a grind producting method and a polymerization producting method.

An example of the method of producing a grinded toner used in the present invention will be described hereinbelow. First, a binder resin, low softening point substance, pigment, dye or magnetic substance as a colorant, and optionally a charge control agent and other additives are fully mixed together with a mixer such as Henschel mixer or ball mill. The obtained mixture is melt kneaded by a heat kneader such as a heating roll, kneader or extruder to compatibilize resin components. A low softening point substance, pigment, dye and magnetic substance are dispersed or dissolved in the resin components. The obtained kneaded product is solidified by cooling, crushed and classified to obtain toner particles.

The silica fine particles (A) (and fine particles (B)) and optionally a desired additive are fully mixed into the toner particles with a mixer such as Henschel mixer to obtain the toner of the present invention.

In the present invention, as for the method of producing a polymerized toner, a method disclosed by JP 56-13945 B in which a disk or multi-fluid nozzle is used to atomize a molten mixture into the air in order to obtain a spherical toner, a method disclosed by JP 36-10231 B, JP 59-53856 A and JP 59-61842 A in which suspension polymerization is used to produce a toner directly, a dispersion polymerization method in which a toner is directly produced by using an aqueous organic solvent capable of dissolving a monomer but not the obtained polymer, an emulsion polymerization method typified by a soap-free polymerization method in which a toner is directly polymerized in the presence of a water-soluble polar polymerization initiator, or a heteroaggregation method in which primary polar emulsion polymerized particles are produced and then polar particles having opposite charge are added to the particles and associated with the particles may be employed.

However, in the dispersion polymerization method, the obtained toner shows an extremely sharp particle diameter distribution but the choice of the used material is poor and the production apparatus is apt to be complex from the viewpoint of the treatment of a waste solvent and the flammability of the solvent. Although the emulsion polymerization method typified by the soap-free polymerization method is effective because the relatively uniform particle diameter distribution of the toner particles is obtained, the environmental characteristics of the toner are apt to deteriorate when the terminus of the used emulsifier or initiator is existent on the surface of the toner particle.

Therefore, the suspension polymerization method under normal pressure or increased pressure is particularly preferred in the present invention because a fine particulate toner having a sharp particle diameter distribution can be relatively easily obtained. A seed polymerization method, in which a monomer is further adsorbed to the obtained polymerization particles and then further polymerization is performed using a polymerization initiator, can also be advantageously used in the present invention.

When the direct polymerization method is used to produce the toner of the present invention, the toner can be produced actually by the following production method. A low softening point substance, colorant, charge control agent, polymerization initiator and other additives are added to a monomer and dissolved or dispersed uniformly by a homogenizer or ultrasonic disperser. The obtained monomer system is dispersed into a water phase containing a dispersion stabilizer with an ordinary stirrer, homomixer, homogenizer or the like. At this point, preferably, the stirring speed and time are adjusted for granulation to ensure that a monomer droplet has a desired toner particle diameter. Thereafter, agitation may be carried out to such an extent that the particulate state is maintained and the sedimentation of the particles is prevented by the function of the dispersion stabilizer. The polymerization temperature is 40° C. or higher, generally 50 to 90° C. The temperature may be raised in the latter half stage of a polymerization reaction, and further an aqueous medium may be partly distilled off in the latter half stage of a reaction or after the end of the reaction in order to remove an unreacted polymerizable monomer or by-product which is the cause of a smell at the time of fixing the toner, or the like. After the end of the reaction, the produced toner particles are cleaned, collected by filtration and dried. In the suspension polymerization method, water is preferably used as a dispersion medium in an amount of 300 to 3,000 parts by mass of water with respect to 100 parts by mass of the monomer system.

A more preferred toner used in the present invention has a structure in which the low softening point substance is encapsulated in a shell resin layer when it is observed with a transmission electron microscope (TEM) in accordance with a toner section measuring method. Such an toner is produced by the direct polymerization method. Since a large amount of the low softening point substance must be contained in the toner from the viewpoint of fixability, the low softening point substance is preferably encapsulated in the shell resin. A toner prepared without encapsulating the low softening point substance in the shell resin cannot be fully crushed into fine particles without using special freeze grinding in the grinding step. As a result, a toner having a wide particle diameter distribution is obtained and the fusion of the toner to the apparatus occurs disadvantageously. The freeze grinding makes the apparatus complex in structure owing to the prevention of dew condensation thereon. When the toner absorbs moisture, the operation efficiency of the toner lowers and the drying step must be added. In order to encapsulate the low softening point substance, the polarities of materials contained in the aqueous medium are set such that the polarity of the main monomer becomes higher than that of the low softening point substance and a small amount of a resin or monomer having high polarity is added. A toner having a so-called core-shell structure in which the low softening point substance is covered with a shell resin can be obtained by using this method. The particle diameter distribution and particle diameter of the toner can be controlled by changing the types and amounts of an inorganic salt which is hardly soluble in water and a dispersant having a protective colloid function, by suitably selecting mechanical device conditions including: stirring conditions such as the rotating speed, number of times of passing, and the shape of stirring blades of a rotor; and the shape of a container, or by adjusting the solid content of an aqueous solution.

A specific method of measuring the section of the toner in the present invention is given below. After the toner is fully dispersed in an epoxy resin which is curable at normal temperature, the resultant is cured at a temperature of 40° C. for 2 days. The obtained cured product is dyed with triruthenium tetroxide and optionally triosmium tetroxide, and a flaky sample is cut out from the cured product by using a microtome having diamond teeth. The configuration of the section of the toner is measured by observing the sample through a transmission electron microscope (TEM). In the present invention, the triruthenium tetroxide dyeing method is preferably used to make a contract between materials by making use of a slight difference in crystallinity between the low softening point substance and the shell forming resin.

A monofunctional polymerizable monomer or polyfunctional polymerizable monomer may be used as the vinyl-based polymerizable monomer which can be radically polymerized and is used to produce a toner by polymerization.

Examples of the monofunctional polymerizable monomers include, styrene polymerization monomers such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylsytyrene; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, dibutyl phosphate ethyl acrylate, and 2-benzoyl oxyethyl acrylate; methacrylic polymerizable monomers such as methyl methacrylate, ethyl methacrylate, n-propyl methacrylate, isopropyl methacrylate, n-butyl methacrylate, isobutyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylates; vinyl esters such as vinyl acetate, vinyl propionate, vinyl benzoate, vinyl butyrate, and vinyl formate; vinyl polymerizable monomers such as vinyl ethers including vinyl methyl ether, vinyl ethyl ether, and vinyl isobutyl ether, and vinyl ketones such as vinyl methyl ketone, vinyl hexyl ketone and vinyl isopropyl ketone.

Examples of the polyfunctional polymerizable monomers include diethylene glycol diacrylate, triethylene glycol diacrylate, tetraethylene glycol diacrylate, polyethylene glycol diacrylate, 1,6-hexanediol diacrylate, neopentyl glycol diacrylate, tripropylene glycol diacrylate, polypropylene glycol diacrylate, 2,2'-bis[4-(acryloxy/diethoxy)phenyl]propane, trimethylolpropane triacrylate, tetramethylolmethane tetracrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2'-bis[4-(methacryloxy/diethoxy)phenyl]propane, 2,2'-bis[4-(methacryloxy/polyethoxy)phenyl]propane, trimethylolpropane trimethacrylate, tetramethylolmethane tetraacrylate, divinylbenzene, divinylnaphthalene, and divinyl ether.

The above monofunctional polymerizable monomers may be used singly or in combination of two or more of them, or a monofunctional polymerizable monomer and a polyfunctional polymerizable monomer may be used in combination. The above polyfunctional polymerizable monomer may be used as a crosslinking agent.

In the present invention, to provide the core-shell structure to the toner, a polar resin is preferably used in combination. Examples of the polar resin such as a polar polymer or polar copolymer which can be used in the present invention are given below.

Examples of the polar resin include a polymer of a nitrogen containing monomer such as dimethylaminoethyl methacrylate or diethylaminoethyl methacrylate, or a copolymer of the nitrogen containing monomer or and a styrene-unsaturated carboxylate ester; a nitrile monomer such as acrylonitrile; a halogen monomer such as vinyl chloride; an unsaturated carboxylate such as acrylate or methacrylate; an unsaturated dibasic acid; an unsaturated dibasic acid anhydride; a polymer of a nitro monomer or a copolymer of the nitro monomer and a styrene-unsaturated carboxylate ester; polyester; and an epoxy resin. More preferable examples include copolymers of styrene and (meth)acrylate, maleate copolymers, saturated and unsaturated polyester resins, and epoxy resins.

Examples of the polymerization initiators to be used include azo and diazo polymerization initiators such as 2,2'-azobis (2,4-dimethylvaleronitrile), 2,2'-azobisisobutyronitrile, 1,1'-azobis (cyclohexane-1-carbonitrile), 2,2'-azobis-4-methoxy-2,4-dimethylvaleronitrile, and azobisisobutyronitrile; polymer initiators having peroxide initiators or peroxides at side chains such as benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis (4,4-t-butylperoxycyclohexyl) propane, and tris-(t-butylperoxy)triazine; persulfates such as potassium persulfate and ammonium persulfate; and hydrogen peroxide.

The polymerization initiator is preferably added in an amount of 0.5 to 20 parts by mass with respect to 100 parts by mass of the polymerizable monomer. The above polymerization initiators may be used singly or in combination of two or more of them.

In the present invention, a known crosslinking agent or chain transfer agent may be added to control the molecular weight, preferably in an amount of 0.001 to 15 parts by mass.

In the present invention, a suitable stabilizer is used as a dispersion medium which is used to produce a toner by a polymerization method using emulsion polymerization, dispersion polymerization, suspension polymerization, seed polymerization, or heteroaggregation. Examples of the stabilizer include: inorganic compounds such as tricalcium phosphate, magnesium phosphate, aluminum phosphate, zinc phosphate, calcium carbonate, magnesium carbonate, calcium hydroxide, magnesium hydroxide, aluminum hydroxide, calcium metasilicate, calcium sulfate, barium sulfate, bentonite, silica, and alumina; organic compounds such as polyvinyl alcohol, gelatin, methyl cellulose, methylhydroxypropyl cellulose, ethyl cellulose, sodium salts of carboxymethyl cellulose, polyacrylic acids and salts thereof, starch, polyacrylamide, polyethylene oxide, and nonionic and ionic surfactants.

When the emulsion polymerization or heteroaggregation is used, an anionic surfactant, cationic surfactant, amphoteric surfactant and nonionic surfactant are used. These stabilizers are preferably used in an amount of 0.2 to 30 parts by mass with respect to 100 parts by mass of the polymerizable monomer.

When an inorganic compound is used out of those stabilizers, a commercially available product may be directly used. Alternatively, the inorganic compound may be formed in a dispersion medium to obtain finer particles.

In order to finely disperse the stabilizer, a surfactant may be used in an amount of 0.001 to 0.1 part by mass. This is aimed to promote a desired function of the above dispersion stabilizer. Specific examples of the surfactant include sodium dodecylbenzenesulfate, sodium tetradecylsulfate, sodium pentadecylsulfate, sodium octylsulfate, sodium oleate, sodium laurate, potassium stearate, and calcium oleate.

The toner of the present invention may be generally used as a one-component or two-component developer. When the toner of the present invention is used as a non-magnetic toner containing no magnetic substance which is a one-component developer, a blade or roller is used to adhere the toner to a developing sleeve by triboelectrifying the toner forcedly by friction and to carry the toner.

A description is subsequently given of a carrier which can be used for the two-component developer of the present invention.

A method of measuring the volume-based 50% particle diameter and particle diameter distribution of the carrier particles of the present invention is carried out by using the laser diffraction particle diameter distribution measuring instrument (HELOS) equipped with a dry dispersing unit (RODOS) manufactured by SYNPATEC at a feed air pressure of 3 bar and a suction pressure of 0.1 bar.

As for the particle diameter of the carrier, the volume-based 50% particle diameter (D) of the carrier is preferably 15 to 60 $\mu$m, more preferably 25 to 50 $\mu$m. The carrier contains particles each having a particle diameter (2D/3≧) that corresponds to ⅔ or less of the 50% particle diameter in an amount of preferably 5% by volume or less, more preferably 0.1 to 5% by volume.

When the 50% particle diameter of the carrier is smaller than 15 $\mu$m, adhesion of fine particles in the particle diameter distribution of the carrier to a non-image portion in an image may not be prevented sufficiently. When the 50% particle diameter of the carrier is larger than 60 $\mu$m, a nonuniform image may be obtained owing to the large size of the carrier although a brushing mark is not made owing to the stiffness of a magnetic brush.

As for the shape of the carrier, the shape factor SF-1 is preferably 100 to 130.

In the present invention, the shape factor SF-1 is defined as follows. 100 images of the carrier magnified to 500 times by FE-SEM (S-800) manufactured by Hitachi, Ltd. at random. Image information of the magnified carrier images are introduced and analyzed by LuzexIII image analyzer manufactured by Nireco Co., Ltd. through an interface, and the shape factor SF-1 is calculated from the following expression.

$$\text{Shape factor } (SF-1) = \frac{(MXLNG)^2}{AREA} \times \frac{\pi}{4} \times 100$$

(where MXLNG is the absolute maximum length of a particle and AREA is the projection area of the particle.)

The shape factor SF-1 indicates the circularity of a particle.

When SF-1 of the carrier is larger than 130, the added fine particles are collected in the depressed portion of the carrier excessively, whereby the charging properties of the carrier may become nonuniform and the surface of the drum may be easily damaged.

In the present invention, a resistivity of the carrier is preferably $1\times10^8$ to $1\times10^{16}$ $\Omega\cdot$cm, more preferably $1\times10^9$ to $1\times10^{15}$ $\Omega\cdot$cm.

When the resistivity of the carrier is lower than $1\times10^8$ $\Omega\cdot$cm, the adhesion of the carrier to the surface of the photosensitive member readily occurs, whereby the photosensitive member may be damaged or the carrier may be directly transferred to paper, thereby causing an image defect. Further, a development bias leaks through the carrier and may disturb an electrostatic latent image formed on the photosensitive drum.

When the resistivity of the carrier is higher than $1\times10^{16}$ $\Omega\cdot$cm, an image having overemphasized edges is apt to be formed and charge on the surface of the carrier hardly leaks, whereby the density of the image may be reduced by a charge-up phenomenon and fogging and scattering may occur because a newly supplied toner cannot be charged. Further, the toner may be charged together with the substance of the inner wall of a developing device or the like and the amount of charge on the toner may become nonuniform. In addition, an image defect caused by such as electrostatic adhesion of an external additive tends to occur.

The resistivity of the carrier is measured by using a particle absolute resistance measuring instrument manufactured by Shinku Riko Co., Ltd. The carrier which has been left at a temperature of 23° C. and a humidity of 60% for 24 hours or longer is placed in a measuring cell having a diameter of 20 mm (0.283 cm$^2$), and is sandwiched between 120 g/cm$^2$ load electrodes, and the resistivity measured at an application voltage of 500 V when the carrier has a thickness of 2 mm.

As for magnetic properties of the carrier, the magnetization of the carrier in 1000/4$\pi$ (kA/m) is preferably 20 to 100 Am$^2$/kg, more preferably 30 to 65 Am$^2$/kg. That is, the carrier preferably has a low magnetic force.

When the magnetization of the carrier is higher than 100 Am$^2$/kg, although it is connected with the particle diameter of the carrier, the density of magnetic brushes formed on the developing sleeve at a development pole decreases and the ears thereof become long and stiff. As a result, sweeping nonuniformity readily occurs on a copy image and the deterioration of the durability of the toner is readily caused by copying or printing a large number of copies.

When the magnetization of the carrier is lower than 20 Am$^2$/kg, even when the carrier fine particles are removed, the magnetic force of the carrier lowers and the adhesion of the carrier readily occurs, thereby reducing the toner-conveying ability of the toner.

The magnetic properties of the toner are measured by BHV-35 vibration magnetic field type magnetic property automatic recorder manufactured by Riken Denshi Co., Ltd. As for the measurement conditions of the magnetic properties of the carrier particles, the magnetization of the carrier is obtained by generating an external magnetic field of 1000/4$\pi$ (kA/m). The carrier particles are densely packed in a cylindrical plastic vessel so that the particles do not move, the magnetization moment of the carrier is measured in this state, and the actual weight of the carrier is measured when the sample is placed to obtain the magnetization (Am$^2$/kg).

The carrier of the present invention may be a resin coated carrier including a ferrite core, preferably a magnetic substance dispersion coated carrier having a core that is prepared by dispersing a metal compound into a binder resin and is coated with a resin. In the case of a magnetic substance dispersion coated carrier, the content of a metal oxide in the core is preferably 80 to 99% by mass.

The metal compound used in the core of the carrier is magnetite or ferrite having ferromagnetism represented by the following formula (2) or (3).

$$MO \cdot Fe_2O_3 \quad (2)$$

$$M \cdot Fe_3O_4 \quad (3)$$

(wherein M is a trivalent, divalent, or monovalent metal ion).

Examples of M include Mg, Al, Si, Ca, Sc, Ti, V, Cr, Mn, Fe, Co, Ni, Cu, Zn, Sr, Y, Zr, Nb, Mo, Cd, Sn, Ba, Pb, and Li. These may be used singly or plurally.

Specific examples of the metal compound particles (ferromagnetic body) having ferromagnetism represented by the above formula (2) and (3) include iron oxides such as magnetite, Zn—Fe ferrites, Mn—Zn—Fe ferrites, Ni—Zn—Fe ferrites, Mn—Mg—Fe ferrites, Ca—Mn—Fe ferrites, Ca—Mg—Fe ferrites, Li—Fe ferrites, and Cu—Zn—Fe ferrites.

Further, in the present invention, the metal compound particles used in the core of the carrier may be a mixture of the above metal compound having ferromagnetism and the following non-magnetic metal compound. In this case, the non-magnetic metal compound is preferably a compound having higher resistance than that of the metal compound particles having ferromagnetism. The amount of the metal compound having ferromagnetism is preferably 50 to 95% by mass based on the total of metal oxides.

Examples of the non-magnetic metal compound include $Al_2O_3$, $SiO_2$, CaO, $TiO_2$, $V_2O_5$, CrO, $MnO_2$, $\alpha$-$Fe_2O_3$, CoO, NiO, CuO, ZnO, SrO, $Y_2O_3$, and $ZrO_2$. In this case, one metal compound may be used but a mixture of at least two metal compounds is particularly preferably used. In this case, particles similar to each other in specific gravity and shape are preferably used to improve adhesion to a binder resin and strength of the carrier core particles.

Specific examples of combinations preferably include magnetite and hematite, magnetite and $\gamma$-$Fe_2O_3$, magnetite and $SiO_2$, magnetite and $Al_2O_3$, magnetite and $TiO_2$, magnetite and Ca—Mn—Fe ferrites, magnetite and Ca—Mg—Fe ferrites. Of those, a combination of a magnetite and hematite is particularly preferably used.

The binder resin for the carrier core particles used in the present invention is a thermosetting resin, preferably a resin which is partially or wholly crosslinked three-dimensionally. Since the metal compound particles to be dispersed can be firmly bonded together by using this binder resin, the strength of the carrier core can be increased, the elimination of the metal compound hardly takes place even when a large number of copies are reproduced, and further the resin can be coated better. As a result, the amount of adsorbed water can be controlled to the range of the present invention.

Although the method of obtaining a magnetic substance dispersion carrier core is not limited to a method described below, a polymerization method in which a monomer is polymerized in a solution containing the monomer and a solvent uniformly dispersed or dissolved therein to form particles is preferably used in the present invention. The metal oxide to be dispersed in the carrier core particles is preferably lipophilized. Therefore, a magnetic substance dispersion resin carrier core having a sharp particle diameter distribution and containing only a small amount of fine particles can be obtained.

In the present invention, to achieve high image quality, the particle diameter of a carrier which is used in combination with a toner having a weight average particle diameter of 1 to 10 $\mu$m is preferably reduced in accordance with the particle diameter of a toner. The above production method is particularly preferred because a carrier containing a small amount of fine particles can be produced regardless of its average particle diameter even when the particle diameter of the carrier is reduced.

A radical polymerizable monomer may be used as the monomer to be used in the binder resin of the carrier core particles. Examples include styrene; styrene derivatives such as o-methylstyrene, m-methylstyrene, p-methoxystyrene, p-ethylstyrene, and p-tertiary-butylstyrene; acrylates such as acrylic acid, methyl acrylate, ethyl acrylate, n-butyl acrylate, n-propyl acrylate, isobutyl acrylate, octyl acrylate, dodecyl acrylate, 2-ethylhexyl acrylate, stearyl acrylate, 2-chloroethyl acrylate, and phenyl acrylate; methacrylates such as methacrylic acid, methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; 2-hydroxyethyl acrylate, and 2-hydroxyethyl methacrylate; acrylonitrile, methacrylonitrile, and acrylamide; vinyl ethers such as methyl vinyl ether, ethyl vinyl ether, propyl vinyl ether, n-butyl vinyl ether, isobutyl vinyl ether, $\beta$-chloroethyl vinyl ether, phenyl vinyl ether, p-methyl phenyl ether, p-chlorophenyl ether, p-bromophenyl ether, p-nitrophenyl vinyl ether, and p-methoxyphenyl vinyl ether; and a diene compound such as butadiene.

Those monomers may be used singly or as a mixture, and the suitable composition of a polymer can be selected to obtain preferred properties.

As described above, the binder resin for the carrier core particles is preferably crosslinked three-dimensionally, and the crosslinking agent for crosslinking the binder resin three-dimensionally is preferably that having at least two polymerizable double bonds per molecule. Examples of this type of crosslinking agent include: aromatic divinyl compounds such as divinylbenzene and divinylnaphthalene; ethylene glycol diacrylate; ethylene glycol dimethacrylate; triethylene glycol dimethacrylate; tetraethylene glycol dimethacrylate; 1,3-butylene glycol dimethacrylate; trimethylolpropane triacrylate; trimethylolpropane trimethacrylate; 1,4-butanediol diacrylate; neopentyl glycol diacrylate; 1,6-hexanediol diacrylate; pentaerythritol triacrylate; pentaerythritol tetraacrylate; pentaerythritol dimethacrylate; pentaerythritol tetramethacrylate; glycerolacrooxy dimethacrylate; N,N-divinylaniline; divinyl ether; divinyl sulfide; and divinyl sulfone. Two or more types of those are suitably used as a mixture. The crosslinking agent may be mixed to a mixture containing the polymerizable monomer in advance and may also be added during the polymerization when required.

Examples of other monomers of the binder resin in the carrier core particles include: bisphenols and epichlorohydrin as starting materials of an epoxy resin; phenols and aldehydes as starting materials of a phenolic resin; urea and aldehydes as starting materials of a urea resin; and melamine and aldehydes.

Phenolic resins are the most preferable for the binder resin. Examples of the starting materials for the phenolic resins include: phenol; m-creosol; 3,5-xylenol; p-alkylphenol; resolcil; phenol compounds such as p-tert-butylphenol;

and aldehydes such as formalin, paraformaldehyde, and furfural. Phenol and formalin are a particularly preferable combination.

When the above phenolic resin or melamine resin is used, a basic catalyst may be used as a curing catalyst. Various basic catalysts which are used for the production of an ordinary resol resin may be used. Specific examples of the basic catalysts include: ammonia water; and amines such as hexamethylenetetramine, diethyltriamine, and polyethyleneimine.

In the present invention, the metal compound contained in the carrier core is preferably lipophilized to obtain a sharp particle diameter distribution for the magnetic carrier particles and to prevent the elimination of the metal compound particles from the carrier. When carrier core particles containing the lipophilized metal compound dispersed therein are to be formed, a polymerization reaction proceeds in a liquid containing a monomer and a solvent uniformly dispersed or dissolved therein and at the same time particles indissoluble in the solution are produced. There are considered to be the function of introducing the metal oxide into each particle uniformly and highly densely and the function of preventing the agglomeration of particles to make the particle diameter distribution sharp. Further, when the lipophilized metal compound is used, a suspension stabilizer such as calcium fluoride does not need to be used, and the impediment of charging properties caused by the residual suspension stabilizer remained on the surface of the carrier, the coating nonuniformity of a coat resin, and the impediment of a reaction when a reactive resin such as a silicon resin is applied can be prevented.

Lipophilization is preferably carried out with a lipophilizing agent which comprises an organic compound having one or more functional groups selected from an epoxy group, amino group, and mercapto group, or a mixture thereof.

The magnetic metal oxide particles are treated with preferably 0.1 to 10 parts by mass, more preferably 0.2 to 6 parts by mass of a lipophilizing agent with respect to 100 parts by mass of the magnetic metal oxide particles to improve the lipophilic property and hydrophobic property of the magnetic metal oxide particles.

Examples of a lipophilizing agent having an epoxy group include, γ-glycidoxypropylmethyldiethoxysilane, γ-glycidoxypropyltrimethoxysilane, β-(3,4-epoxycyclohexyl)trimethoxysilane, epichlorohydrin, glycidol, and a styrene-glycidyl (meth) acrylate copolymer.

Examples of a lipophilizing agent having an amino group include γ-aminopropyltrimethoxysilane, γ-aminopropylmethoxydiethoxysilane, γ-aminopropyltriethoxysilane, Nβ(aminoethyl)-γ-aminopropyltrimethoxysilane, N-β(aminoethyl)-γ-aminopropylmethyl dimethoxysilane, N-phenyl-γ-aminopropyltrimethoxysilane, ethylenediamine, ethylenetriamine, a styrene-dimethylaminoethyl (meth) acrylate copolymer, and isopropyltri (N-aminoethyl) titanate.

Examples of a lipophilizing agent having a mercapto group include mercaptoethanol, mercaptopropionic acid, and γ-mercaptopropyltrimethoxysilane.

A resin for coating the carrier core surface is not particularly limited. Specific examples of the resin include: polystyrene; an acrylic resin such as a styrene/acrylic copolymer; vinyl chloride; vinyl acetate; a polyvinylidene fluoride resin; a fluorocarbon resin; a perfluorocarbon resin, a solvent soluble perfluorocarbon resin; polyvinyl alcohol; polyvinyl acetal; polyvinyl pyrolidone; a petroleum resin; cellulose; cellulose derivatives; a novolac resin; a low molecular weight polyethylene, a saturated alkyl polyester resin; an aromatic polyester resin; a polyamide resin; a polyacetal resin; a polycarbonate resin; a polyethersulfone resin; a polysulfone resin; a polyphenylene sulfide resin; a polyetherketone resin; a phenolic resin; a modified phenolic resin; a maleic resin; an alkyd resin; an epoxy resin; an acrylic resin; unsaturated polyesters gained through polycondensation of maleic anhydride, terephthalic acid, and polyhydric alcohol; a urea resin; a melamine resin; a urea/melamine resin; a xylene resin; a toluene resin; a guanamine resin; a melamine/guanamine resin; an acetoguanamine resin; a glyptal resin; a furan resin; a silicon resin; a polyimide resin; a polyamideimide resin; a polyetherimide resin; and a polyurethane resin.

Out of those, a silicon resin is preferred from the viewpoints of adhesion to the core and the prevention of spending. The silicon resin may be used singly but preferably used in combination with a coupling agent to increase the strength of the coating layer and to control charge to a preferred level. Further, a part of the above coupling agent is preferably used as a so-called "primer" which is applied to the surface of the carrier core before the coupling agent is used to coat the resin. The coating layer obtained thereafter can be formed in a more highly adhesive state with a covalent bond.

$\mu$minosilane is preferably used as the coupling agent. As a result, an amino group having positive charging property can be introduced onto the surface of the carrier, thereby making it possible to impart negative charging properties to the toner well. Further, the existence of an amino group activates both a lipophilizing agent which is preferably applied to the metal compound and a silicon resin. Thus, the adhesion of the silicon resin to the carrier core is further improved and the curing of the resin is promoted, thereby making it possible to form a strong coating layer.

Hereinafter, a description will be given of the image forming method (the image forming apparatus) of the present invention with reference to the accompanying drawings.

FIG. 1 is a schematic structural view of an embodiment of the image forming apparatus in accordance with the present invention. The image forming apparatus of this embodiment is a laser beam printer that utilizes an electrophotographic method with a transfer process, in which a contact charging process, a reversal development process, and a cleaner-less system are applied. For the laser beam printer, the maximum paper size of the paper to be fed is A3.

(1) Overall Schematic Configuration of Printer (a) Image Bearing Member (Photosensitive Drum)

Reference numeral 1 designates an image bearing member having a rotating drum form (hereinafter, referred to as a "photosensitive drum"). As illustrated in a layer structure model view of FIG. 2, the photosensitive drum 1 has an under-coating layer 1$b$ that prevents light interference and improves the adhesion properties of an upper layer, a photocharge generating layer 1$c$, and a charge transport layer 1$d$ on the surface of an aluminum cylinder (a conductive drum substrate) 1$a$ such that these three layers 1$b$ to 1$d$ are applied thereon from the bottom in that order.

The photosensitive drum to be used in the present invention is not limited to one described above. Thus, typical the configurations of other applicable image bearing members will be described with reference to FIGS. 3 to 5, respectively.

In the present invention, in addition to the above photosensitive member, other applicable photosensitive members include those having their respective photosensitive layers mainly containing organic photoconductors. Here, the organic photoconductors may include those using organic photoconductive polymers such as polyvinyl carbazole or those containing organic photoconductive materials of lower molecular weights in the binder resins.

Figure 3:
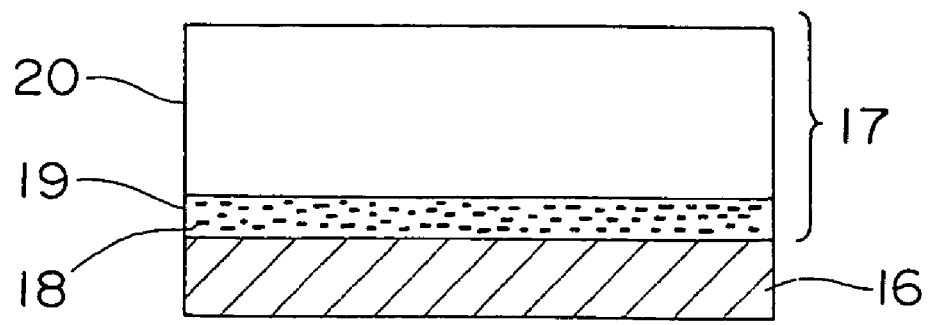
FIG. 3 is a schematic diagram showing an example of an electrophotographic photosensitive member to which the present invention can be applied.

The electrophotographic photosensitive member shown in FIG. 3 includes a photosensitive layer 17 formed on a conductive support 16. The photosensitive layer 17 has a laminated structure constructed of: a charge generating layer 19 in which charge generating materials 18 are dispersed in a binder resin; and a charge transport layer 20. In this case, the charge transport layer 20 is laminated on the charge generating layer 19.

Figure 4:
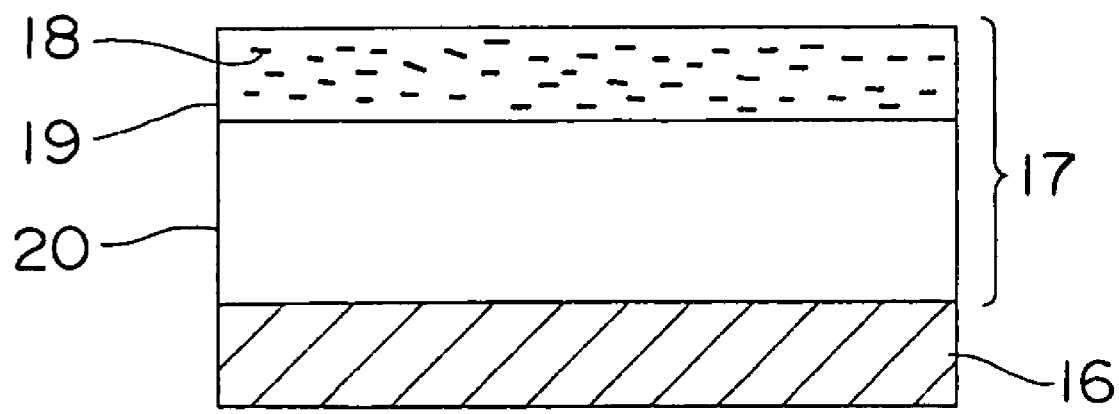
FIG. 4 is a schematic diagram showing another example of an electrophotographic photosensitive member to which the present invention can be applied.

The electrophotographic photosensitive member shown in FIG. 4 is different from one shown in FIG. 3 in point that the charge transport layer 20 is formed under a charge generating layer 19 in the laminate. The charge generating layer 19 may contain a charge transport material in addition to the charge generating material 18.

Figure 5:
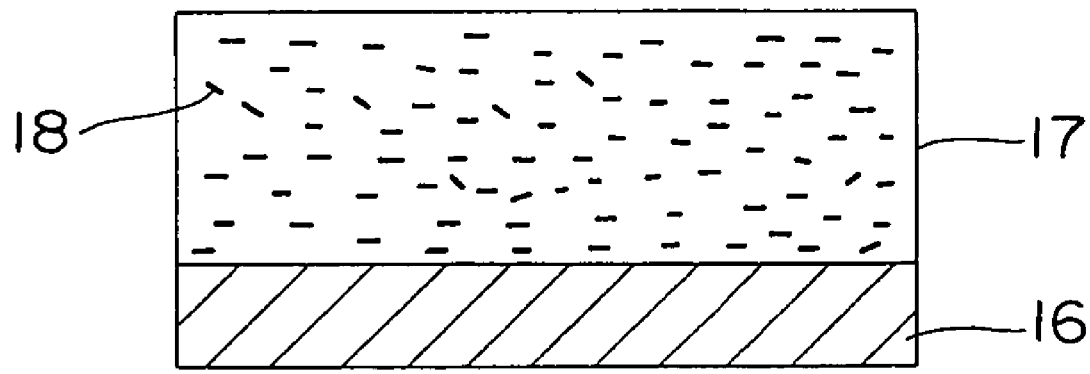
FIG. 5 is a schematic diagram showing still another example of an electrophotographic photosensitive member to which the present invention can be applied.

In the electrophotographic photosensitive member shown in FIG. 5, the photosensitive layer 17 is formed on a conductive support 16. The photosensitive layer 17 contains the charge generating material 18 and a charge transporting material (not shown) in the binder resin.

Among these photosensitive members, for the present invention, preferable is one constructed of the conductive support 16, the charge generating layer 19, and the charge transport layer 20, which are laminated in that order.

The conductive support 16 is formed of a cylinder, a sheet, or a film made of a metal such as aluminum or stainless steel, paper, plastic, or the like. In addition, if required, the cylinder, the sheet, or the film may have a resin layer that contains a conductive polymer layer or a conductive particle such as tin oxide, titanium oxide, or silver particle.

Furthermore, an under-coating layer (an adhesive layer) having barrier and under-coating functions may be formed between the conductive support 16 and the photosensitive layer 17.

The under-coating layer is formed for the purposes of: improving the adhesion and coating properties of the photosensitive layer; protecting the support; covering the defects of the support; improving a charge-injection property from the support; keeping the photosensitive layer from electrically breaking; and so on. The film thickness of such a layer is approximately from 0.2 to 2 µm.

Examples of the charge generating material include pyrylium, thiopyrylium dyes, a phthalocyanine pigment, an anthanthrone pigment, a dibenzpyrenequinone pigment, a pyranthrone pigment, an azo pigment, an indigo pigment, a quinacridone pigment, asymmetric quinocyanine, and quinocyanine.

Examples of the charge transporting materials include, hydrazone compounds, pyrazoline compounds, styryl compounds, oxazole compounds, thiazole compounds, triarylmethane compounds, and polyarylalkane compounds.

The charge generating layer 19 is prepared by dispersing the charge generating materials together with 0.5 to 4-fold volume of binder resin in a solvent by methods using a homogenizer, an ultrasonic generator, a ball mill, an oscillating ball mill, a sand mill, an atoliter, a roll mill, or the like, applying a resulting dispersion and drying the resultant. The thickness of the resulting layer is 5 µm or less, preferably 0.01 to 1 µm.

The charge transport layer 20 is typically prepared by dissolving the charge transporting material and a binder resin in a solvent to be applied, followed by being dried. A mixing ratio of the charge transporting material and the binder resin is approximately from 2:1 to 1:2. Examples of such a solvent include ketones such as acetone and methylethyl ketone, esters such as methyl acetate and ethyl acetate, aromatic hydrocarbons such as toluene and xylene, chlorine-based hydrocarbons such as chlorobenzene, chloroform, and carbontetrachloride. For applying the dispersion solution, one of coating methods such as dip coating, spray coating, and spinner-coating may be used. Furthermore, the applied solution is dried by blow or dried while standing, at a temperature of 10 to 200° C., preferably 20 to 150° C. for 5 minutes to 5 hours, preferably 10 minutes to 2 hours. The film thickness of the resulting charge transport layer is from 5 to 30 µm, more preferably from 10 to 25 µm.

Preferred examples of the binder resin to be used when forming the charge generating layer 19 and the charge transporting layer 20 include resins chosen from an acrylic resin, styrene resins, polyester, a polycarbonate resin, polyarylate, polysulfone, polyphenylene oxide, an epoxy resin, a polyurethane resin, an alkyd resin, and an unsaturated resin. In particular, polymethyl methacrylate, polystyrene, a styrene/acrylonitrile copolymer, a polycarbonate resin, and a diallyl phthalate resin are preferable.

Furthermore, the charge generating layer 19 or the charge transport layer 20 may contain one or more of various kinds of additives such as an antioxidant, an ultraviolet absorber, and a lubricant.

(b) Charging Unit

In FIG. 1, reference numeral 2 designates a contact-charging device as a charging unit uniformly charging the peripheral surface of the photosensitive drum 1. In this embodiment, a charging roller (a roller charging device) is used as such a device.

The charging roller 2 includes a core metal 2a, in which both ends are rotatably held by the respective bearing members (not shown). The core metal 2a is biased toward the photosensitive drum by a pressing spring 2e. Therefore, the charging roller 2 is in press contact with the surface of the photosensitive drum 1 with a predetermined pressing force and is allowed to rotate accompany with the rotation of the photosensitive drum 1. A pressure-contact portion between the photosensitive drum 1 and the charging roller 2 is a charging portion (a charging nip portion) "a".

A charging bias voltage is applied on the core metal 2a of the charging roller 2 from a power source S1 under predetermined conditions, so that the peripheral surface of the photosensitive drum 1 is contact-charged to obtain a predetermined polarity/potential. In this embodiment, the charging bias voltage to be applied on the charging roller 2 is an oscillating voltage, which is obtained by superimposing a DC voltage (Vdc) on an AC voltage (Vac).

Specifically, an oscillating voltage, which is obtained by superimposing a DC voltage (Vdc) of −500 V and a sine-wave AC voltage (Vac) at a frequency (f) of 1,000 Hz and a peak-to-peak voltage (Vpp) of 400 V, is applied to uniformly contact charging the peripheral surface of the photosensitive drum 1 to −500 V (dark potential Vd).

Figure 2:
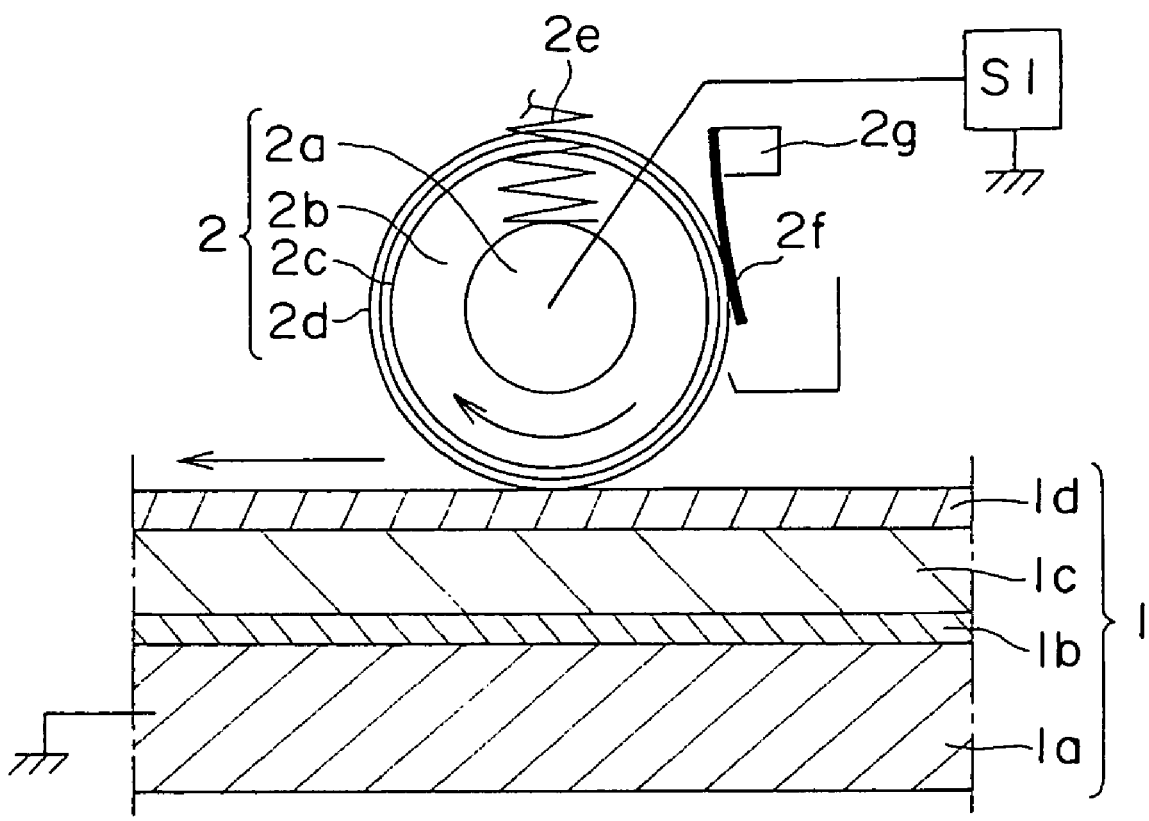
FIG. 2 is a schematic diagram showing an example of a charging roller to which the present invention can be applied.

As shown in the layer structure view of FIG. 2, the charging roller 2 has a longitudinal length of 320 mm and a three-layer structure such that an elastic layer 2b, a resistance controlling layer 2c, and a surface layer 2d are laminated on the outer peripheral surface of the core metal (the supporting member) 2a in that order. The elastic layer 2b is a foamed sponge layer for lowering the charging noise, the resistance controlling layer 2c is a conductive layer for obtaining uniform resistance throughout the charging roller 2, and the surface layer 2d is a protective layer provided for preventing the generation of leak current even if any defect such as a pin hole is found on the photosensitive drum 1.

The charging roller 2 will be described in more detail.

Alternatively, in FIG. 2, the charging roller 2 may be constructed of the elastic layer 2b and the surface layer 2d in the absence of the resistance controlling layer 2c.

The conductive support 2a to be used in the present invention may be made of a metal material such as iron, copper, stainless steel, aluminum, or nickel. Furthermore, the metal material may be plated for providing the surface thereof with anti-corrosive and scratch-resistance properties. In this case, however, the conductivity of the conductive support 2a should be kept at a desired level.

The charging roller 2 is allowed to retain its good adhesion uniformly to the photosensitive member 1 because the elastic layer 2b is designed to have an appropriate elasticity.

The conductivity of the elastic layer 2b can be adjusted by the addition of a conductive particle such as carbon black or a conductive agent such as alkaline metal salt and ammonium salt in the elastic material such as rubber. The elasticity of the elastic layer 2b can be adjusted by the addition of process oil, a plasticizer, or the like. Specific examples of elastic materials for the elastic layer 2b include natural rubber, synthetic rubbers such as ethylene propylene diene ethylene rubber (EPDM), styrene-butadiene rubber (SBR), silicon rubber, polyurethane rubber, epichlorohydrin rubber, isoprene rubber (IR), butadiene rubber (BR), nitrile-butadiene rubber (NBR), and chloroprene rubber (CR), and resins such as polyamide resin, polyurethane resin, silicon resin, and fluororesin. Furthermore, the foamed material of the elastic material described above may be used for the elastic layer 2b.

Preferably, the elastic layer 2b has its own conductivity with an electric resistivity of $1 \times 10^3$ to $1 \times 10^{10}$ ($\Omega \cdot cm$). In addition, the film thickness of the elastic layer 2b depends on the diameter of the conductive support 16 and there is no particular limitation.

Mostly, the surface layer 2d is provided for preventing the plasticizer or like in the elastic layer 2b from bleeding out on the surface of the charging roller 2 and retaining the slidability and smoothness of the surface of the charging roller. The surface layer 2d may be formed by coating or by covering with a tube.

For making the surface layer 2d by means of coating, specifically, the materials include resins such as polyamide resin, polyurethane resin, acryl resin, fluororesin, and silicon resin and rubbers such as epichlorohydrin rubber, urethane rubber, chloroprene rubber, and acrylonitrile rubber. In addition, the coating methods preferably include dip coating, roll coating, and spray coating.

Furthermore, for covering the surface layer 2d with the tube, specifically, the materials include nylon 12, 4-fluoroethylene/perfluoroalkylvinylether copolymer resin (PFA), polyvinylidene fluoride (PVDF), 4-fluoroethylene/6-fluoropropylene copolymer resin (FEP), and thermoplastic elastomers of polystyrene, polyolefin, polyvinyl chloride, polyurethane, polyester, polyamide, and the like.

The tube may be a heat-shrinkable tube or a non-heat-shrinkable tube. For retaining appropriate conductivity on the surface layer 2d, conductive particles such as carbon black and carbon graphite and conductive metal oxides such as conductive titanium oxide, conductive zinc oxide, and conductive tin oxide may be used for the conductive agent.

The electric resistivity of the surface layer 2d is preferably in the range of $1 \times 10^6$ to $1 \times 10^{14}$ ($\Omega \cdot cm$).

Furthermore, the film thickness of the surface layer 2d is preferably in the range of 2 to 500 $\mu$m, more preferably in the range of 2 to 250 $\mu$m.

In many cases, the resistance controlling layer 2c is provided for controlling the resistance of a charging member. Specifically, materials to be used for the resistance controlling layer 2c include resins such as polyamide resin, polyurethane resin, fluororesin, and silicon resin, epichlorohydrin rubber, urethane rubber, chloroprene rubber, and acrylonitrile rubber. For adjusting the resistance, in the resistance controlling layer 2c, the conductive particle such as carbon black or graphite, conductive metal oxide such as conductive titanium oxide or conductive zinc oxide, or conductive agent such as alkaline metal salt or ammonium salt may be dispersed.

The resistance controlling layer 2c is also formed by coating or covering with a tube.

The electric resistivity of the resistance controlling layer is preferably in the range of $1 \times 10^6$ to $1 \times 10^{10}$ ($\Omega \cdot cm$).

Furthermore, the film thickness thereof is preferably in the range of 10 to 1000 $\mu$m, more preferably in the range of 10 to 750 $\mu$m.

The electric resistivity of the resistance controlling layer according to the present invention corresponds to the volume resistivity measured according to Japanese Industrial Standard (JIS) K6911.

In FIG. 2, reference symbol 2f designates a cleaning member for cleaning the charging roller 2. In this embodiment, it is a flexible cleaning film. As shown in the figure, the cleaning film 2f has one end fixed on a supporting member 2g. The supporting member 2g is arranged in parallel to the longitudinal direction of the charging roller 2 and reciprocates with respect to the longitudinal direction for a certain distance. In addition, the other end of the cleaning film 2f is provided as a free end and the film is arranged so as to form a contact nip with the charging roller 2 at the surface portion near the free end. When the supporting member 2g is driven by a driving motor of a printer through a gear train such that the supporting member 2g is allowed to reciprocate in the longitudinal direction for a certain distance. Then, the reciprocation of the supporting member 2g allows the surface layer 2d of the charging roller 2 to be slidably rubbed with the cleaning film 2f, removing contaminants (e.g., fine particle toner and external additive) attached on the surface layer 2d of the charging roller 2.

(c) Information-Writing Unit

Reference numeral 3 designates an exposure device provided as an information-writing unit adapted to forming an electrostatic latent image on the surface of the charged photosensitive drum 1. The exposure device 3 may be one using an LED array, a semiconductor laser, a liquid crystal shutter array, or the like.

The exposure device 3 used in this embodiment is a laser beam scanner using a semiconductor laser. The exposure device 3 generates a laser beam as an output being modulated corresponding to an image signal sent from a host device such as an image reading apparatus to the printer. Using the output laser beam, subsequently, the exposure device performs a laser-scanning exposure L (an image exposure) on the uniformly charged surface of the rotating photosensitive drum 1 at an exposure position b. The laser-scanning exposure L lowers the potential of the area irradiated with the laser light on the surface of the photosensitive drum 1, so that electrostatic latent images corresponding to image information, which is formed by laser-scanning exposure, are formed sequentially on the rotating photosensitive drum 1 surface.

(d) Developing Unit

Reference numeral 4 denotes a developing device as a developing unit that visualizes an electrostatic latent image by supplying a developer (toner) to the electrostatic latent image on the photosensitive drum 1. In this embodiment, the developing device is a reversal developing device that employs a two-component magnetic brush development system.

Reference symbol 4a designates a developing container and 4b designates a non-magnetic developing sleeve. The developing sleeve 4b is arranged such that the outer peripheral surface of the developing sleeve 4b is partially exposed to the outside and is arranged rotatably in the developing container 4a. Reference symbol 4c designates a magnet roller inserted and installed in the developing sleeve 4b so as to be fixed in an unrotatably manner; 4d, a developer coating blade; 4e, a two-component developer contained in the developing container; 4f, a developer stirring member arranged in the bottom portion of the developing container 4a; and 4d, a toner hopper that stores a supplemental toner.

The surface of the rotating developing sleeve 4b is coated with the developer as a thin layer. The toner in the developer is transferred to a developing part c and selectively adhered on the surface of the photosensitive drum 1 by an electric field caused by a developing bias under predetermined conditions, which is applied by a power source S2, so as to correspond to an electrostatic latent image. As a result, the electrostatic latent image is developed as a toner image. In this embodiment, the toner adheres on an exposed bright region on the surface of the photosensitive drum 1 to allow the reversal development of the electrostatic latent image.

The thin layer of the developer on the developing sleeve 4b, which has passed through the developing part c, is caused to return to a developer reservoir portion in the developing container 4a in accordance with the rotation of the developing sleeve 4b.

For keeping the toner density of the two-component developer 4e in the developer 4a in a substantially predetermined range, the toner density of the two-component developer 4e in the developing container 4a is detected by an optical toner density sensor or the like (not shown). Depending on the detected information, the toner hopper 4g is driven under control to supply the toner in the toner hopper 4g to the two-component developer 4e in the developing container 4a. Subsequently, the toner supplied to the two-component developer 4e is stirred with the stirring member 4f.

(e) Transferring and Fixing Units

Referring again to FIG. 1, reference numeral 5 designates a transfer device. In this embodiment, it is a transfer roller. The transfer roller 5 is in press contact with the photosensitive drum 1 with a predetermined pressing force. The press-contacting nip portion is provided as a transferring part d. From a sheet-feeding mechanism (not shown), a transfer material (also referred to as a member to be transferred or a recording material) P is fed to the transferring part d with predetermined control timing.

The transfer material P fed to the transferring part d is conveyed while being nipped between the rotating photosensitive drum 1 and the transfer roller 5. During this rotation, a positive-polarity transfer bias, which is opposite to negative polarity, i.e., a regular charge polarity of the toner, is applied on the transfer roller 5 from a power source S3. In this embodiment, an voltage of +2 kV is applied on the transfer roller 5 to allow electrostatic transfer of the toner images on the surface of the photosensitive drum 1 to the transfer material P in order, which has been nipped and conveyed through the transferring region d.

The transfer material P, on which the toner image has been transferred through the transferring part d, are gradually separated from the surface of the rotating photosensitive drum 1 and then conveyed to a fixing device 6 (e.g., a thermal roller fixing device) where the transfer material P is subjected to the process of fixing the toner image. After that, it is printed out as an image-formed product (print or copy).

(2) Cleaner-Less System and Control of Toner Charge Amount

The printer of this embodiment is of a cleaner-less type. That is, the printer is not equipped with a dedicated cleaning device that removes a small amount of transfer residual toner on the surface of the photosensitive drum 1 after transferring the toner image on the transfer material P. The transfer residual toner on the surface of the photosensitive drum 1 after the transfer reaches the developing part c through the charging part a and the exposure part b in accordance with the subsequent rotation of the photosensitive drum 1. Then, the transfer residual toner is developed and cleaned (recovered) by the developing device 4 (a cleaner-less system).

In this embodiment, the developing sleeve 4b of the developing device 4 rotates in the direction opposite to the rotating direction of the surface of the photosensitive drum 1 at the developing part c as described above. It is advantageous for recovering the transfer residual toner on the photosensitive drum 1.

The transfer residual toner on the surface of the photosensitive drum 1 passes through the exposure part b, therefore the exposure process is performed in the state that the transfer residual toner is remained on the photosensitive drum 1. However, the amount of transfer residual toner is small, so that a large influence of the transfer residual toner cannot be observed.

As described above, however, the transfer residual toner is a mixture of toners having different charge polarities, that is, normal polarity and reverse polarity (reversal toner), and toner with a small charging amount. Among them, the reversal toner or the toner with a small charging amount adheres on the charging roller 2 at the time of passing through the charging part a, so that poor charging may occur as a result of toner contamination on the charging roller more than permissible level.

Furthermore, for effective cleaning of the transfer residual toner on the surface of the photosensitive drum 1 simultaneous with developing by the developing device 3, the charge polarity of the transfer residual toner on the photosensitive drum 1, which is carried to the developing part c, is of normal polarity. In addition, it is necessary to set the charging amount of the transfer residual toner large enough to develop an electrostatic latent image on the photosensitive drum 1. As to the reversal toner and the transfer residual toner with an insufficient charging amount, the transfer residual toner cannot be removed or recovered from the photosensitive drum 1, resulting in a cause of defective image.

In this embodiment, therefore, there is provided a toner charging amount control unit 7 uniformly making the charge polarity of the transfer residual toner into negative polarity (i.e., normal polarity) at a position on a downstream side of the rotation direction of the photosensitive drum 1 from the transferring part d and on an upstream side of the rotation direction of the photosensitive drum 1 from the charging part a.

As the charge polarity of the transfer residual toner is evenly set negative (i.e., normal polarity), the charging part a located on the further downstream side, the degree of reflection to the photosensitive drum 1 increases at the time of charging the surface of the photosensitive drum 1 from above the transfer residual toner. As a result, the transfer residual toner can be prevented from being adhered on the charging roller 2.

Next, a description will be given of the recovery of the transfer residual toner in the developing process.

The developing device 4 adopts a cleaner-less system that removes the transfer residual toner on the surface of the photosensitive drum 1 at the time of image development.

The absolute value of the charging-amount of the toner, which is required for recovering the transfer residual toner on the photosensitive drum 1 by the developing device 4 should be smaller than the absolute value of the charging amount of the toner obtained at the time of charging with the toner charging amount control unit 7. This is so-called charge elimination. If the charging amount of the transfer residual toner is large, the affinity of toner with the photosensitive drum 1 increases instead. As a result, the transfer residual toner cannot be recovered by the developing device 4 and image defects will be generated.

However, for preventing the toner from being adhered on the charging roller 2 as described above, the transfer residual toner should be subjected to charge elimination for recovering the transfer residual toner being substantially charged to have the negative polarity by the toner charging amount control unit 7 by using the developing device 4. The charge elimination is performed on the charging part a. That is, the transfer residual toner is subjected to an AC charge elimination since an AC voltage of 1400 V at 1000 Hz is applied onto the charging roller 2 as described above. In addition, adjusting the AC voltage to be applied on the charging roller 2 allows the charging amount of the toner after passing through the charging part a to be adjusted by the AC charge elimination. In the developing process, the transfer residual toner on the photosensitive drum 1, which should not be developed, is recovered by the developing device 4 from the above reason.

Therefore, triboelectricity of the transfer residual toner on the photosensitive drum 1 carried from the transferring part d to the charging part a is subjected to charging so as to be made into negative polarity (i.e., normal polarity) in a uniform manner by the toner charging amount control unit 7, which is connected to a power source S4 to prevent the transfer residual toner from being adhered on the charging roller 2, while charging the photosensitive drum 1 to a predetermined potential by the charging roller 2. Simultaneously, in the charging roller 2, the charging amount of the transfer residual toner charged by the toner charging amount control unit 7 is controlled to an appropriate charging amount such that it will be subsequently allowed to develop an electrostatic latent image on the photosensitive drum 1 by the developing device 4. Such a control permits an effective recovery of the transfer residual toner in the developing device, so that it will be allowed to provide an image forming apparatus that does not cause poor charging and also does not form a defective image while making use of the merit of the cleaner-less system.

Now, the present invention will be described more specifically with reference to the following examples. However, the present invention will not be limited to these examples.

In the following description, at first, a method for manufacturing a magnetic carrier will be described.

PRODUCTION EXAMPLE 1 FOR MAGNETIC CARRIER

In an aqueous medium, phenol/formaldehyde monomers (50:50) were mixed and dispersed. After that, 600 parts by mass of 0.25-$\mu$m magnetite particles which have been surface-treated with a titanium coupling agent, and 400 parts by mass of 0.6-$\mu$m hematite particle were evenly dispersed with respect to 100 parts by mass of the monomers. The monomers were polymerized together by properly adding ammonia in the mixture, resulting in a core material 1 for a magnetic substance dispersion type coated carrier. The core material 1 had a volume-basis 50% particle diameter of 33 $\mu$m, a saturation magnetization of 38 $Am^2/kg$.

Next, 20 parts by mass of toluene, 20 parts by mass of butanol, 20 parts by mass of water, and 40 parts by mass of ice were put in a four-necked flask, followed by adding 40 parts by mass of a mixture of 15 moles of $CH_3SiCl_3$ and 10 moles of $(CH_3)_2SiCl_2$ while stirring. Furthermore, the mixture was further stirred for 30 minutes, and then a condensation reaction was performed for 1 hour at 60° C. Subsequently, siloxane was sufficiently washed with water and then dissolved in a mixture solvent of toluene, methylethyl ketone, and butanol to prepare silicone varnish with a solid content of 10%.

In the silicone varnish, 2.0 parts by mass of ion exchange water, 2.0 parts by mass of the following curing agent (1), 1.0 part by mass of the following aminosilane coupling agent (2), and 5.0 parts by mass of the following silane coupling agent (3) were simultaneously added with respect to 100 parts by mass of siloxane solid content to prepare a carrier-coating solution I. The solution I was applied using a coater (SPIRA COATAR, manufactured by Okada Seiko Co. Ltd.) so as to be 1 part by mass of a resin coat with respect to 100 parts by mass of the core material I. Consequently, a magnetic substance dispersion coated carrier 1 was obtained.

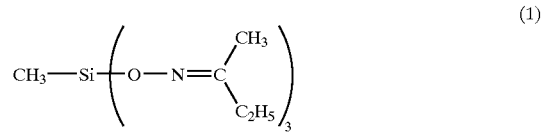

(1)

The carrier had a volume-basis 50% particle diameter of 33 $\mu$m, the content of particles having particle diameters of ⅔ or less of the 50% particle diameter (2D/3≧) was 3.2% by volume, and a value of SF-1 was 113. In addition, a resistivity was $7\times10^3$ Ω·cm, and a saturation magnetization was 41 $Am^2/kg$.

PRODUCTION EXAMPLE 2 FOR MAGNETIC CARRIER

A carrier was produced in the same manner as in Production Example 1 except that a carrier core material was produced by changing the ratio of phenol to formaldehyde to 45:55 and that the obtained carrier core material was classified. A coated carrier 2 having a volume-basis 50% diameter of 13 μm was obtained.

PRODUCTION EXAMPLE 3 FOR MAGNETIC CARRIER

A carrier was produced in the same manner as in Production Example 1 except that a carrier core material was produced by changing the ratio of phenol to formaldehyde to 55:45 and that the obtained carrier core material was classified. A coated carrier 3 having a volume-basis 50% diameter of 70 μm was obtained.

PRODUCTION EXAMPLE 4 FOR MAGNETIC CARRIER

A mixture of 15 parts by mass of MgO, 10 parts by mass of MnO, and 75 parts by mass of $Fe_2O_3$ into fine particles was pulverized, followed by adding water for granulation. After that, the resulting granules were calcined at 1200° C., resulting of a ferrite carrier core material having a volume-basis 50% particle diameter of 33 μm and a content of 9.4% by volume of particles having particle diameters of ⅔ or less of the 50% particle diameter (2D/3≧).
A coated carrier 4 was obtained by providing the core material with a resin coat in the same way as that of Production Example 1. For this carrier, the value of SF-1 was 126. Furthermore, a resistivity of the carrier was $3 \times 10^{12}$ Ω·cm and a saturation magnetization was 57 Am²/kg.

PRODUCTION EXAMPLE 5 FOR MAGNETIC CARRIER

The ferrite carrier core material obtained in Production Example 4 was classified, resulting in a ferrite carrier core material having a volume-basis 50% particle diameter of 38 μm and a content of 4.1% by volume of particles having particle diameters of ⅔ or less of the 50% particle diameter (2D/3≧). A coated carrier 5 was obtained by providing the above core material with a resin coat in the same way as that of Production Example 1.

PRODUCTION EXAMPLE 6 FOR MAGNETIC CARRIER

The ferrite carrier core material obtained in Production Example 4 was pulverized and classified, resulting in a ferrite carrier core material having a volume-basis 50% diameter of 36 μm and a content of 4.2% by volume of particles having particle diameters of ⅔ or less of the 50% particles diameter (2D/3≧).
A coated carrier 6 was obtained by providing the above core material with a resin coat in the same way as that of Production Example 1. The resulting coated carrier 6 had an SF-1 value of 139.

PRODUCTION EXAMPLE 7 FOR MAGNETIC CARRIER

A coated carrier 7 was obtained in the same way as that of Production Example 1, except that the used amount of magnetite was changed to 200 parts by mass and the used amount of hematite was changed to 800 parts by mass.
The coated carrier 7 had a volume-basis 50% diameter of 36 μm and a content of 4.4% by volume of particles having particle diameters of ⅔ or less of the 50% particle diameter (2D/3≧). In addition, it had an SF-1 value of 115. Furthermore, the carrier had a resistivity of $2 \times 10^{16}$ Ω·cm and a saturation magnetization of 18 Am²/kg.

PRODUCTION EXAMPLE 8 FOR MAGNETIC CARRIER

A coated carrier 8 was obtained in the same way as that of Production Example 1, except that 1% of carbon black was added in the solution I.
The coated carrier 8 had a volume-basis 50% diameter of 34 μm and a content of 3.9% by volume for particles having particle diameters of ⅔ or less of the 50% particle diameter (2D/3≧). In addition, the carrier had an SF-1 value of 118. Furthermore, the carrier had a resistivity of $8 \times 10^6$ Ω·cm and a saturation magnetization of 47 Am²/kg.

PRODUCTION EXAMPLE 9 FOR MAGNETIC CARRIER

A coated carrier 9 was obtained in the same way as that of Production Example 1, except that 1000 parts by mass of magnetite was used instead of using hematite.
The coated carrier 9 had a volume-basis 50% diameter of 38 μm and a content of 4.4% by volume for particles having particle diameters of ⅔ or less of the 50% diameter (2D/3≧). In addition, the carrier had an SF-1 value of 116. Furthermore, the carrier had a resistivity of $5 \times 10^{14}$ Ω·cm and a saturation magnetization of 102 Am²/kg.

Physical properties of the resulting coated carriers 1 through 9 were shown in Table 2.

TABLE 2

| | volume-basis 50% particle diameter (μm) | Particles having particle diameters of 2D/3 or less (% by volume) | SF-1 | Resistivity (Ωcm) | Magnetization in 1000/4π (Am²/kg) |
|---|---|---|---|---|---|
| Coat carrier 1 | 33 | 3.2 | 113 | $7 \times 10^{13}$ | 41 |
| Coat carrier 2 | 13 | 4.7 | 112 | $2 \times 10^{14}$ | 40 |
| Coat carrier 3 | 70 | 4.4 | 115 | $5 \times 10^{13}$ | 43 |
| Coat carrier 4 | 33 | 9.4 | 126 | $3 \times 10^{12}$ | 57 |
| Coat carrier 5 | 38 | 4.1 | 126 | $3 \times 10^{12}$ | 57 |
| Coat carrier 6 | 36 | 4.2 | 139 | $2 \times 10^{12}$ | 57 |
| Coat carrier 7 | 36 | 4.4 | 115 | $2 \times 10^{16}$ | 18 |
| Coat carrier 8 | 34 | 3.9 | 118 | $8 \times 10^6$ | 47 |
| Coat carrier 9 | 38 | 4.4 | 116 | $5 \times 10^{14}$ | 102 |

Hereinafter, a description will be given of a method for manufacturing a charging roller.

Manufacturing Method 1 for Charging Roller

For 100 parts by mass of EPDM, 40 parts by mass of conductive carbon black, 50 parts by mass of paraffin oil, and appropriate amounts of a foaming agent, a crosslinking agent, and other compounding agents were added and the whole was kneaded to obtain a conductive compound I. Then, the compound I was vulcanized and molded on a 6-mm diameter stainless core metal, followed by grinding the outer diameter of the product. As a result, an elastic layer 1 made of a foaming material with 3 mm in thickness was prepared.

Subsequently, 14.5 parts by mass of conductive carbon black was blended in 10 parts by mass of an ether thermoplastic urethane elastomer (Asker C hardness: 62) and the mixture was then dissolved and mixed for 10 minutes at 180° C. using a pressure kneader. After that, the mixture was cooled and then pulverized, followed by pelletizing the mixture with a single-spindle extruder.

By molding the pellet with the extruder, a seamless tube of 10.5 mm in inner diameter and 500 Mm in wall thickness was obtained. Hereinafter, this tube was referred to as a tube A.

Furthermore, using the same pellet, a disk sheet of 5 mm in diameter and 3 mm in thickness were prepared using a heat press. Then, the resulting disk sheet was placed in paraffin oil (a softening agent for the elastic layer 1) and left alone for 7 days. The percentage change of weight and volume resistivity before or after the leave were measured for the sheet. As a result, the percentage change of weight was 0.03%, the volume resistivity before the leave was $1.9 \times 10^6$ Ω·cm, and the volume resistance after the leave was $2.0 \times 10^6$ Ω·cm, which were not substantially different from each other.

In addition, 100 parts by mass of a thermoplastic elastomer (Asker C hardness: 62) in which a polystyrene molecular chain was covalently bonded with one end of an ethylene butylene rubber molecular chain and an olefin crystal was covalently bonded with the other end thereof was mixed with 14 parts by mass of conductive carbon black, followed by dissolving and kneading for 10 minutes at 200° C. using a pressure kneader. Furthermore, after cooling, the mixture was pulverized with a pulverizer. Then, the pulverized product was pelletized using a single-spindle extruder. Furthermore, the pellet was extruded with an extruder, resulting a seamless tube with 11.5 mm in inner diameter and 200 μm in wall thickness. Hereinafter, the tube was referred to as a tube B.

Subsequently, the charging roller 1 was obtained by blowing the air into the tube A to extend the outer diameter thereof, inserting the elastic layer 1 into the tube A to cover the elastic layer 1 with the tube A, and covering the outer peripheral surface of the tube A with the tube B in a similar manner.

The respective characteristics of the resulting charging roller 1 were as follows.

Value of Electric Resistance:

L/L environment (Temp: 15° C., Humid: 10%) $1.2 \times 10^6$ Ω

H/H environment (Temp: 32.5° C., Humid: 80%) $1.0 \times 10^6$ Ω

Surface Hardness (Asker C): 62 Degrees

The value of electric resistance was measured using a resistance meter, HIOKI 3119 DIGITAL MΩ HITESTER (manufactured by Hioki E.E. Co., Ltd.), by closely contacting and wrapping the outer periphery of the charging roller with aluminum foil with 10 mm in width and applying a DC voltage of 250V between the core metal and the aluminum foil.

The surface hardness (Asker C) was measured using an Asker-C rubber hardness meter (manufactured by Kobunshi Keiki Co., Ltd.). A value of the surface hardness was calculated by five-point average. In addition, the measurement was performed with a load of 500 g on one side.

PRODUCTION EXAMPLE 2 FOR CHARGING ROLLER

A charging roller 2 was obtained in the same way as that of Production Example 1, except that the Asker C hardness of a thermoplastic elastomer used for the tube A was 25 degrees and the Asker C hardness of a thermoplastic elastomer used for the tube B was 25 degrees.

PRODUCTION EXAMPLE 3 FOR CHARGING ROLLER

A charging roller 3 was obtained in the same way as that of Production Example 1, except that the Asker C hardness of a thermoplastic elastomer used for the tube A was 86 degrees and the Asker C hardness of a thermoplastic elastomer used for the tube B was 86 degrees.

PRODUCTION EXAMPLE 4 FOR CHARGING ROLLER

A charging roller 4 was obtained in the same way as that of Production Example 1, except that the Asker C hardness of a thermoplastic elastomer used for the tube A was 35 degrees and the Asker C hardness of a thermoplastic elastomer used for the tube B was 35 degrees.

PRODUCTION EXAMPLE 5 FOR CHARGING ROLLER

A charging roller 5 was obtained in the same way as that of Production Example 1, except that the Asker C hardness of a thermoplastic elastomer used for the tube A was 77 degrees and the Asker C hardness of a thermoplastic elastomer used for the tube B was 77 degrees.

Hereinafter, a description will be given of a method for manufacturing an inorganic fine powder to be used in the present invention.

Figure 8:
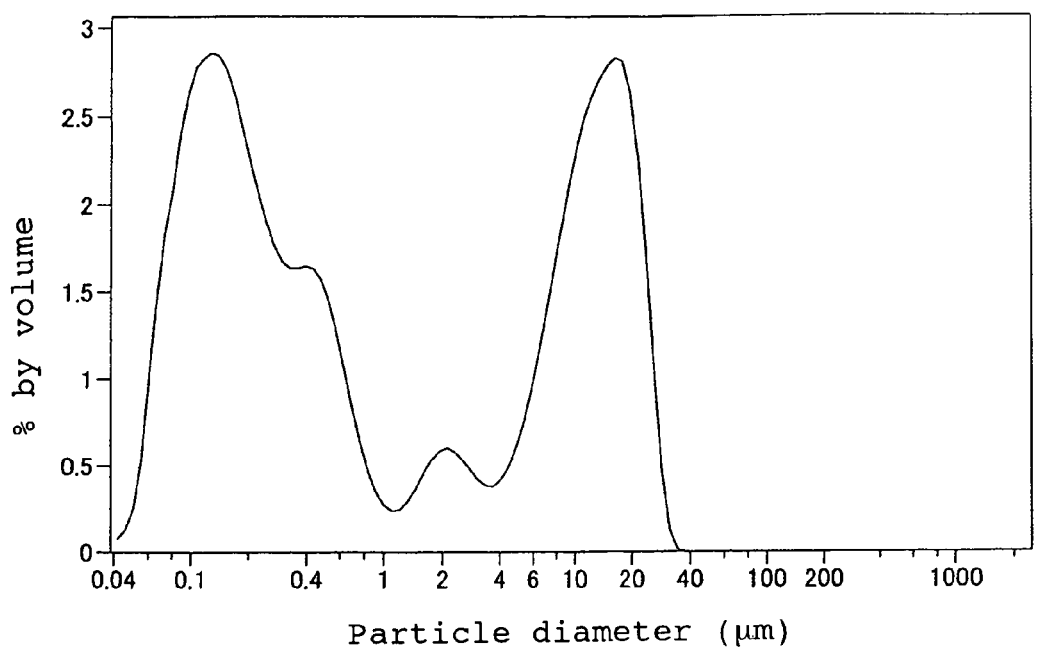
FIG. 8 is a chart showing a distribution of volume-basis particle diameter for silica fine particle 1 produced in Production Example 1 of inorganic fine particles.

PRODUCTION EXAMPLE 1 FOR ORGANIC FINE POWDER 100 parts by mass of the commercially available Aerosil #90 silica fine particles obtained by vapor-phase oxidation and high-temperature baking (manufactured by Nippon Aerosil Co., Ltd.) was added to a hexane solution containing 10 parts by mass of hexamethyldisilazane and 15 parts by mass of polydimethylsiloxane (trade name: KF-96-50cs, manufactured by Shin-Etsu Chemical Co., Ltd.). Then, the solution was subjected to hydrophobic treatment at 250° C. to obtain crude silica. The crude silica was cracked by means of a pin mill at a rate of 50 m/sec and classified by means using a Coanda effect so as to control the particle diameter of the crude silica, resulting in silica fine particles (1) (number average length of primary particles of 40 nm, actually measured BET specific surface area of 64 m²/g). FIG. 8 is a chart showing the volume-basis particle diameter distribution for the obtained silica fine particles (1) measured by a laser diffraction particle diameter distribution meter.

PRODUCTION EXAMPLE 2 FOR ORGANIC FINE POWDER

Hydrophobic treatment was carried out on the crude silica in Production Example 1 at a slightly lower temperature than that in Production Example 1. And then cracking, classification, and the control of particle diameter were carried out to obtain silica fine particles (3) (number average length of primary particles of 40 nm, actually measured BET specific surface area of 72 m$^2$/g).

PRODUCTION EXAMPLE 3 FOR ORGANIC FINE POWDER

Hydrophobic treatment was carried out on the crude silica in Production Example 1 at a slightly higher temperature than that in Production Example 1. And then cracking, classification, and the control of particle diameter were carried out to obtain silica fine particles (4) (number average length of primary particles of 40 nm, actually measured BET specific surface area of 68 m$^2$/g).

PRODUCTION EXAMPLE 4 FOR ORGANIC FINE POWDER

Crude silica was produced in the same manner as in Production Example 1, and then hydrophobic treatment and cracking were carried out on the crude silica in the same manner as in Production Example 1 to obtain silica fine particles (5) (number average length of primary particles of 40 nm, actually measured BET specific surface area of 78 m$^2$/g).

PRODUCTION EXAMPLE 5 FOR ORGANIC FINE POWDER

Crude silica was produced in the same manner as in Production Example 1, and then hydrophobic treatment and cracking were carried out on the crude silica in the same manner as in Production Example 1 to obtain silica fine particles (6) (number average length of primary particles of 40 nm, actually measured BET specific surface area of 59 m$^2$/g).

PRODUCTION EXAMPLE 6 FOR ORGANIC FINE POWDER

Crude silica was produced in the same manner as in Production Example 1, and no hydrophobic treatment was carried out on the crude silica. The crude silica was directly used as silica fine particles (7) (number average length of primary particles of 55 nm, actually measured BET specific surface area of 65 m$^2$/g).

PRODUCTION EXAMPLE 7 FOR ORGANIC FINE POWDER

Hydrophobic treatment was carried out on the crude silica in Production Example 1 at a slightly lower temperature than that in Production Example 2. And then classification and the control of particle diameter were carried out in the same manner as in Production Example 1, without being subjected to cracking, to obtain silica fine particles (8) (number average length of primary particles of 40 nm, actually measured BET specific surface area of 72 m$^2$/g).

PRODUCTION EXAMPLE 8 FOR ORGANIC FINE POWDER

Hydrophobic treatment was carried out on the crude silica in Production Example 1 at a slightly higher temperature than that in Production Example 3. And then classification and the control of particle diameter were carried out in the same manner as in Production Example 1, without being subjected to cracking, to obtain silica fine particles (9) (number average length of primary particles of 40 nm, actually measured BET specific surface area of 76 m$^2$/g).

PRODUCTION EXAMPLE 9 FOR ORGANIC FINE POWDER

Crude silica was produced in the same manner as in Production Example 3, and then hydrophobic treatment was carried out on the crude silica in the same manner as in Production Example 1, without being subjected to cracking and classification, to obtain silica fine particles (10) (number average length of primary particles of 40 nm, actually measured BET specific surface area of 51 m$^2$/g).

PRODUCTION EXAMPLE 10 FOR ORGANIC FINE POWDER

Crude silica having a slightly larger primary particle diameter than that in Production Example 1 was produced, hydrophobic treatment was carried out by means of only 15 parts of dimethyl polysiloxane (trade name: KF-96-50cs, manufactured by Shin-Etsu Chemical Co., Ltd.) with respect to 100 parts of the obtained crude silica, and then cracking, classification, and the control of particle diameter were carried out on the crude silica to obtain silica fine particles (11) (number average length of primary particles of 60 nm, actually measured BET specific surface area of 35 m$^2$/g).

PRODUCTION EXAMPLE 11 FOR ORGANIC FINE POWDER

Hydrophobic treatment was carried out on the crude silica in Production Example 1 at a higher temperature (above 350° C.) than that in Production Example 3. And then cracking and classification were carried in the same manner as in Production Example 1 to obtain silica fine particles (12) (number average length of primary particles of 40 nm, actually measured BET specific surface area of 25 m$^2$/g).

PRODUCTION EXAMPLE 12 FOR ORGANIC FINE POWDER

Hydrophobic treatment was carried out on the crude silica in Production Example at a lower temperature (below 200° C.) than that in Production Example 2. And then cracking and classification were carried out in the same manner as in Production Example 1 to obtain silica fine particles (13) (number average length of primary particles of 40 nm, actually measured BET specific surface area of 130 m$^2$/g).

PRODUCTION EXAMPLE 13 FOR ORGANIC FINE POWDER

Crude silica was produced in the same manner as in Production Example 1, hydrophobic treatment was carried out by means of 10 parts of hexamethyldisilazane and 2 parts of dimethyl polysiloxane (trade name: KF-96-50cs, manufactured by Shin-Etsu Chemical Co., Ltd.) with respect to 100 parts of the obtained crude silica, and then cracking, classification, and the control of particle diameter were carried out on the crude silica in the same manner as in Production Example 1 to obtain silica fine particles (14) (number average length of primary particles of 40 nm, actually measured BET specific surface area of 84 m²/g).

PRODUCTION EXAMPLE 14 FOR ORGANIC FINE POWDER

Crude silica was produced in the same manner as in Production Example 1, hydrophobic treatment was carried out by means of 10 parts of hexamethyldisilazane and 38 parts of dimethyl polysiloxane (trade name: KF-96-50cs, manufactured by Shin-Etsu Chemical Co., Ltd.) with respect to 100 parts of the obtained crude silica, and then cracking, classification, and the control of particle diameter were carried out on the crude silica in the same manner as in Production Example 1 to obtain silica fine particles (15) (number average length of primary particles of 40 nm, actually measured BET specific surface area of 57 m²/g).

Hereinafter, a description will be given of a method for manufacturing a toner.

PRODUCTION EXAMPLE 1 FOR TONER

To a four-necked flask (2 liters) equipped with a high-speed stirring device, TK-homomixer, 910 parts by mass of ion exchange water and 1 part by mass of polyvinyl alcohol were added. The revolving speed of the stirring device was adjusted to 12,000 r.p.m. and the mixture was heated at 60° C., resulting in a dispersion medium.

On the other hand, the followings were used for the dispersoid system.

| | |
|---|---|
| Styrene monomer | 165 parts by mass |
| n-butylacrylate monomer | 35 parts by mass |
| Phthalocyanine pigment (C.I. Pigment Blue 15:3) | 10 parts by mass |
| Saturated polyester resin (polycondensate of bisphenol A propylene oxide and terephthalic acid; Mw: 10,000, Mn: 6,000, acid value: 10 mg KOH/g, glass transition point: 70° C.) | 10 parts by mass |
| Di-tert-butyl aluminum salicylate compound | 3 parts by mass |
| Divinylbenzene | 0.2 part by mass |
| Low softening point substance (Paraffin wax; Mw = 1,200, Mn = 750, Mw/Mn = 1.6) | 30 parts by mass |

The above components were mixed and dispersed for 3 hours using an atoliter, followed by adding 5 parts by mass of a polymerization initiator, 2,2'-azobis (2,4-dimethylvaleronitril). Then, the resulting dispersed product was poured into the above dispersion medium while keeping the revolving speed and the whole was subjected to granulating for 12 minutes. After that, the high-speed stirring device was replaced with a propeller stirrer and the inner temperature was increased to 65° C., allowing the polymerization at 50 r.p.m. for 10 hours.

After the completion of the polymerization, slurry was cooled, washed, and dried, resulting in a cyan toner particle (1). The resulting cyan toner particle (1) was subjected to the measurement of particle diameter distribution using a coulter counter. As a result, the weight average particle diameter was 6.8 μm.

To 100 parts by mass of the resulting cyan toner particle (1), the following components were added.

| | |
|---|---|
| Silica fine particle (1) [an average primary particle diameter of 40 nm and a BET specific surface area of 64 m²/g] | 0.6 part by mass |
| Silica fine particle (2) subjected to hydrophobic treatment with polydimethyl siloxane [an average primary particle diameter of 13 nm and a BET specific surface area of 135 m²/g] | 0.3 part by mass |
| Titanium oxide fine particle (1) subjected to hydrophobic treatment with hexamethyldisilazane [an average primary particle diameter of 30 nm and a BET specific surface area of 110 m²/g] | 0.3 part by mass |

The mixture was stirred using Henschel mixer (manufactured by Mitsui Mining Co., Ltd.) and a cyan toner (1) was obtained. The formulation and physical properties of the resulting cyan toner (1) were shown in Table 2 and Table 3.

PRODUCTION EXAMPLES 2 TO 17 FOR TONERS

Cyan toners (2) to (17) were produced in the same manner as in production Example 1 of the cyan toner (1), except that kind and/or amount of the silica fine particles to be used were changed as shown in Tables 3 and 4. The formulation and physical properties of the resulting cyan toners (2) to (18) were shown in Table 3 and Table 4.

MANUFACTURING EXAMPLE 18 FOR TONER

| | |
|---|---|
| Styrene-2-ethylhexylacrylate-divinylbenzene copolymer (a glass transition point of 65° C.) | 100 parts by mass |
| Phthalocyanine pigment (C.I. Pigment Blue 15:3) | 7 parts by mass |
| Saturated polyester resin (polycondensate of bisphenol A propylene oxide and terephthalic acid; Mw: 10,000, Mn: 6,000, acid value: 10 mg KOH/g, glass transition point: 65° C.) | 5 parts by mass |
| Di-tert-butyl aluminum salicylate compound | 1 part by mass |
| Low softening point substance (Paraffin wax; Mw = 1,200, Mn = 750, Mw/Mn = 1.6) | 8 parts by mass |

The above components were preliminary mixed using Henschel mixer, and then the mixture was dissolved and kneaded at 130° C. using a two-axial extruding kneader. After cooling, the mixture was roughly pulverized with a hammer mill, followed by pulverizing with an air-jet type fine pulverizer and classification to obtain the cyan particle (2) having an average circularity of 0.937.

The same external addition as that of Manufacturing Method 1 was performed on the cyan particle (2). As a result, a cyan toner (18) was obtained. The formulation and physical properties of the resulting cyan toner (18) were shown in Table 3 and Table 4.

MANUFACTURING METHOD 19 FOR TONER

The cyan toner particle (2) in Manufacturing Method 18 was treated to have a spherical shape using a surface-treating device that performs a mechanical type treatment with the rotation of a propeller. As a result, the cyan particle (3) was obtained. The average circularity of the resulting cyan particle (3) was 0.955.

The same external addition as that of Manufacturing Method 1 was performed to the cyan particle (3). As a result, a cyan toner (19) was obtained. The formulation and physical properties of the resulting cyan toner (19) were shown in Table 3 and Table 4.

PRODUCTION EXAMPLE 20 FOR TONER

A magenta toner (1), a yellow toner (1), and a black toner (1) were prepared in the same way as that of Production Example 1, except that a magenta colorant (C.I. pigment red 122), a yellow colorant (C.I. pigment yellow 93), and a black colorant (graft carbon black) were used instead of a phthalocyanine pigment, respectively.

PRODUCTION EXAMPLE 21 FOR TONER

To 100 parts by mass of the cyan toner particle (1) obtained in Production Example 1, the following components were added:

0.6 parts by mass of commercially available silica fine particle R972 [manufactured by Nippon Aerosil Co., Ltd; an average primary particle diameter of 15 nm and a BET specific surface area of 130 m²/g]; and 0.6 parts by mass of titanium oxide fine particle (1) which has been hydrophobic treated with hexamethyldisilazane [an average primary particle diameter of 30 nm and a BET specific surface area of 110 m²/g].

The mixture was diffused using Henschel mixer (manufactured by Mitsui Mining Co., Ltd.) and a cyan toner (20) was obtained. The formulation and physical properties of the resulting cyan toner (20) were shown in Table 3 and Table 4.

Figure 9:
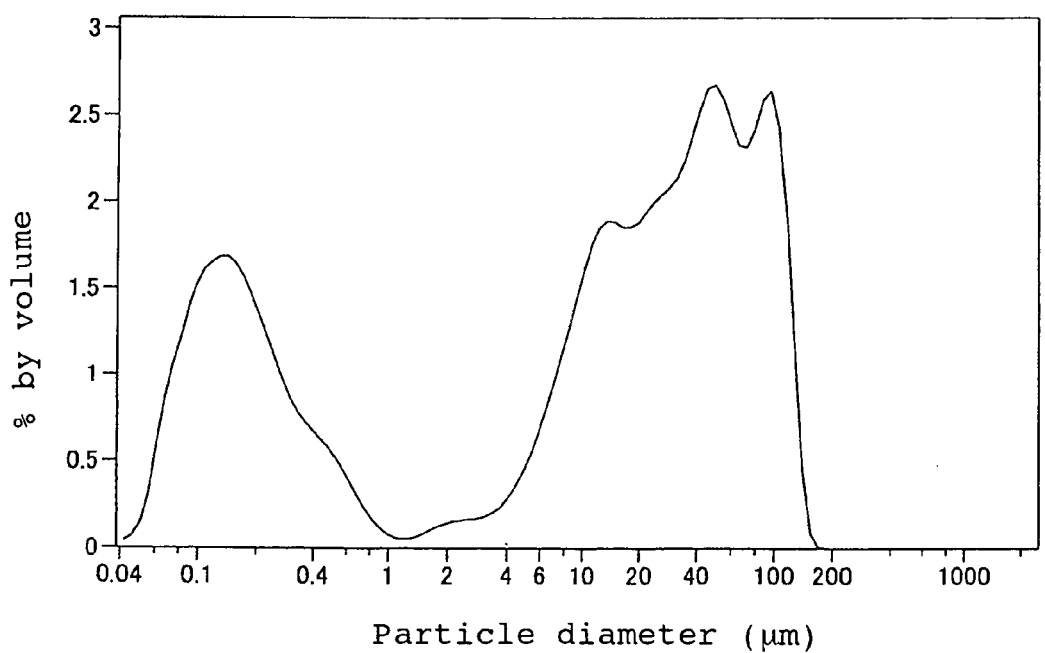
FIG. 9 is a chart showing a distribution of volume-basis particle diameter for silica fine particle used in Production Example 21 of toner.

In addition, FIG. 9 shows the volume-basis particle diameter distribution for the used silica fine particles measured by a laser diffraction particle diameter distribution meter.

PRODUCTION EXAMPLE 22 FOR TONER

To 100 parts by mass of the cyan toner particle (1) obtained in Production Example 1, the following components were added:

0.6 parts by mass of commercially available silica fine particle RX200 [manufactured by Nippon Aerosil Co., Ltd; an average primary particle diameter of 12 nm and a BET specific surface area of 145 m²/g]; and 0.6 parts by mass of titanium oxide fine particle (1) which has been hydrophobic treated with hexamethyldisilazane [an average primary particle diameter of 30 nm and a BET specific surface area of 110 m²/g].

The mixture was diffused using Henschel mixer (manufactured by Mitsui Mining Co., Ltd.) and a cyan toner (21) was obtained. The formulation and physical properties of the resulting cyan toner (21) were shown in Table 3 and Table 4.

Figure 10:
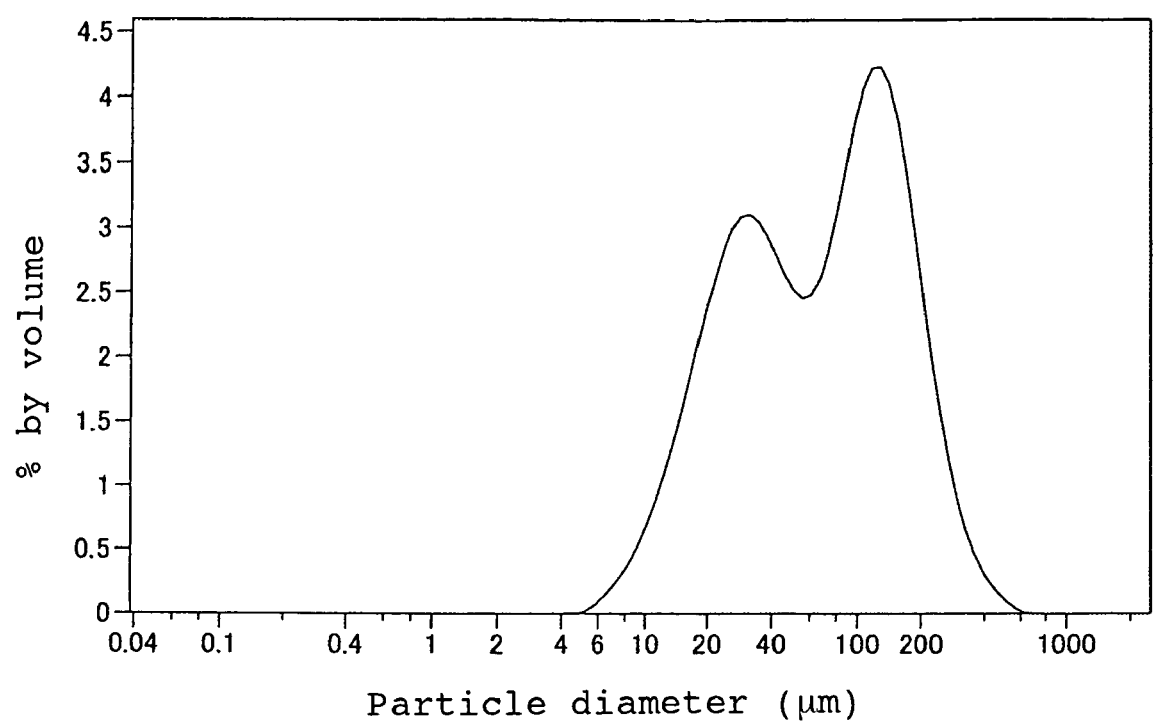
FIG. 10 is a chart showing a distribution of volume-basis particle diameter of silica fine particle used in Production Example 22 of toner.

In addition, FIG. 10 shows the volume-basis particle diameter distribution for the used silica fine particles measured by a laser diffraction particle diameter distribution meter.

TABLE 3

| Cyan toner No. | Toner particle Weight average particle diameter (μm) | Toner particle average circularity | External additive (A) Kinds of (A) | Primary particle diameter (nm) | BET specific surface area (m²/g) | Addition amount (part) | 0.04–1 μm %(*2) | 20–2000 μm %(*3) | 0.04–1 μm MAX peak(*4) (μm) | 1–100 μm min peak(*5) (μm) | Half-value width of peak (*6) | volume average particle diameter (*7) | Amount of oil treatment (part/100 parts) |
|---|---|---|---|---|---|---|---|---|---|---|---|---|---|
| 1 | 6.8 | 0.978 | Silica (1) | 40 | 64 | 0.6 | 42.5 | 8.3 | 0.13 | 16.4 | 15 | 8 | 15 |
| 2 | 6.8 | 0.978 | Silica (3) | 40 | 72 | 0.6 | 16.8 | 9.1 | 0.12 | 18.0 | 17 | 9 | 15 |
| 3 | 6.8 | 0.978 | Silica (4) | 40 | 68 | 0.6 | 74.2 | 7.6 | 0.16 | 16.4 | 14 | 7 | 15 |
| 4 | 6.8 | 0.978 | Silica (5) | 40 | 78 | 0.6 | 67.4 | 6.9 | 0.13 | 15.0 | 3 | 5 | 15 |
| 5 | 6.8 | 0.978 | Silica (6) | 40 | 59 | 0.6 | 35.7 | 14.2 | 0.14 | 19.8 | 38 | 11 | 15 |
| 6(*1) | 6.8 | 0.978 | — | — | — | — | — | — | — | — | — | — | — |
| 7(*1) | 6.8 | 0.978 | Silica (7) | 55 | 65 | 0.6 | 62.7 | 13.7 | 0.15 | 18.0 | 23 | 18 | — |
| 8(*1) | 3.8 | 0.975 | Silica (8) | 40 | 72 | 0.6 | 5.7 | 17.6 | 0.14 | 19.8 | 19 | 9 | 15 |
| 9(*1) | 11.5 | 0.974 | Silica (9) | 40 | 76 | 0.6 | 91.4 | 10.6 | 0.13 | 18.0 | 14 | 8 | 15 |
| 10(*1) | 6.8 | 0.978 | Silica (10) | 40 | 51 | 0.6 | 38.2 | 36.5 | 0.14 | 31.5 | 27 | 11 | 15 |
| 11 | 6.8 | 0.978 | Silica (11) | 60 | 35 | 0.6 | 27.1 | 10.4 | 0.17 | 18.0 | 21 | 14 | 15 |
| 12 | 6.8 | 0.978 | Silica (12) | 40 | 25 | 0.6 | 35.9 | 11.7 | 0.13 | 19.8 | 23 | 16 | 15 |
| 13 | 6.8 | 0.978 | Silica (13) | 40 | 130 | 0.6 | 53.6 | 5.4 | 0.12 | 15.0 | 7 | 4 | 15 |
| 14 | 6.8 | 0.978 | Silica (1) | 40 | 64 | 0.04 | 42.5 | 8.3 | 0.13 | 16.4 | 15 | 7 | 15 |
| 15 | 6.8 | 0.978 | Silica (1) | 40 | 64 | 1.2 | 42.5 | 8.3 | 0.13 | 16.4 | 15 | 7 | 15 |
| 16 | 6.8 | 0.978 | Silica (14) | 40 | 84 | 0.6 | 63.4 | 6.1 | 0.12 | 15.0 | 13 | 0.07 | 2 |
| 17 | 6.8 | 0.978 | Silica (15) | 40 | 57 | 0.6 | 22.5 | 15.2 | 0.17 | 19.8 | 22 | 29 | 38 |
| 18 | 6.8 | 0.937 | Silica (1) | 40 | 64 | 0.6 | 42.5 | 8.3 | 0.13 | 16.4 | 15 | 7 | 15 |
| 19 | 6.8 | 0.955 | Silica (1) | 40 | 64 | 0.6 | 42.5 | 8.3 | 0.13 | 16.4 | 15 | 7 | 15 |
| 20(*1) | 6.8 | 0.978 | R972 | 15 | 130 | 0.6 | 28.6 | 48.9 | 0.14 | 41.7 | 100 | 30 | — |
| 21(*1) | 6.8 | 0.978 | RX200 | 12 | 145 | 0.6 | 0 | 86.3 | none | 26.2 | 190 | 87 | — |

(*1)Toner used for Comparative Examples
(*2)Frequency ratio (%) of particles having particle diameter in the range of 0.04 μm or more and less than 1 μm
(*3)Frequency ratio (%) of particles having particle diameter in the range of 20 μm or more and less than 2000 μm
(*4)Maximum peak particle diameter in the range of 0.04 μm or more and less than 1 μm
(*5)Minimum peak particle diameter in the range of 1 μm or more and less than 100 μm
(*6)Half-value width of a maximum peak present in a range of 1 μm or more and less than 100 μm in particle diameter with respect to volume-basis particle diameter distribution
(*7)Measured by a laser diffraction particle diameter distribution meter

TABLE 4

| Cyan toner No. | External additive (B) | | | | Other external additive | | | |
|---|---|---|---|---|---|---|---|---|
| | Kinds of (B) | Primary particle diameter (nm) | BET specific surface area (m²/g) | Addition amount (part) | Kinds of external additive | Primary particle diameter (nm) | BET specific surface area (m²/g) | Addition amount (part) |
| 1 | Silica (2) | 13 | 135 | 0.3 | Titanium oxide (1) | 30 | 110 | 0.3 |
| 2 | Silica (2) | 13 | 135 | 0.3 | Titanium oxide (1) | 30 | 110 | 0.3 |
| 3 | Silica (2) | 13 | 135 | 0.3 | Titanium oxide (1) | 30 | 110 | 0.3 |
| 4 | Silica (2) | 13 | 135 | 0.3 | Titanium oxide (1) | 30 | 110 | 0.3 |
| 5 | Silica (2) | 13 | 135 | 0.3 | Titanium oxide (1) | 30 | 110 | 0.3 |
| 6(*1) | Silica (2) | 13 | 135 | 0.6 | Titanium oxide (1) | 30 | 110 | 0.3 |
| 7(*1) | Silica (2) | 13 | 135 | 0.3 | Titanium oxide (1) | 30 | 110 | 0.3 |
| 8(*1) | Silica (2) | 13 | 135 | 0.3 | Titanium oxide (1) | 30 | 110 | 0.3 |
| 9(*1) | Silica (2) | 13 | 135 | 0.3 | Titanium oxide (1) | 30 | 110 | 0.3 |
| 10(*1) | Silica (2) | 13 | 135 | 0.3 | Titanium oxide (1) | 30 | 110 | 0.3 |
| 11 | Alumina (1) | 70 | 55 | 0.6 | — | — | — | — |
| 12 | Silica (2) | 13 | 135 | 0.3 | Titanium oxide (1) | 30 | 110 | 0.3 |
| 13 | Titanium oxide (2) | 15 | 220 | 0.6 | — | — | — | — |
| 14 | Silica (2) | 13 | 135 | 2.2 | — | — | — | — |
| 15 | Silica (2) | 13 | 135 | 0.08 | — | — | — | — |
| 16 | Silica (2) | 13 | 135 | 0.3 | Titanium oxide (1) | 30 | 110 | 0.3 |
| 17 | Silica (2) | 13 | 135 | 0.3 | Titanium oxide (1) | 30 | 110 | 0.3 |
| 18 | Silica (2) | 13 | 135 | 0.3 | Titanium oxide (1) | 30 | 110 | 0.3 |
| 19 | Silica (2) | 13 | 135 | 0.3 | Titanium oxide (1) | 30 | 110 | 0.3 |
| 20(*1) | — | — | — | — | Titanium oxide (1) | 30 | 110 | 0.6 |
| 21(*1) | — | — | — | — | Titanium oxide (1) | 30 | 110 | 0.6 |

EXAMPLE 1

A cyan two-component developer 1 was prepared by mixing the cyan toner 1 and the coated carrier 1 together at a toner concentration of 8%.

Next, a developing device of a commercially available copying machine GP55 (manufactured by Canon Co., Ltd.) was altered as shown in FIG. 1. In this case, the developing sleeve having a 10-point average roughness (Rz) of 9.0 obtained by deforming the surface of an SUS sleeve of 16 mm in diameter with sand-blasting was used.

In this example, a toner charging control unit was equipped. A voltage to be applied on such a unit was set to −800 V. In addition, the charging unit was a charging roller 31. The charging roller 31 was biased to be in press-contact with the surface of an image bearing member (a photosensitive drum) 36 with a predetermined pressing force and is allowed to rotate accompany with the rotation of the photosensitive drum 36. A pressure-contact point between the photosensitive drum 36 and the charging roller 2 is a charging portion (a charging nip portion).

In the present example, a charging bias voltage 44 to be applied on the charging roller is an oscillating voltage, which is a result of superimposing a DC voltage (Vdc) on an AC voltage (Vac).

More specifically, an oscillating voltage, which is obtained by superimposing a DC (Vdc) of −500 V and a sinusoidal-wave AC voltage (Vac) at a frequency (f) of 1,000 Hz and a peak-to-peak voltage of 1400 V, is applied to make a uniform contact charging of −500 V (dark potential Vd) on the peripheral surface of the photosensitive drum 36.

A cleaning unit was removed, 250 V of development contrast and −150 V of reversed contrast to eliminate fogging were provided. A developing bias having a non-continuous alternate electric field was applied and the cyan two-component developer 1 was used. Under each of the conditions of high temperature and high humidity (H/H: 30° C./80%) and low temperature and low humidity (L/L: 15° C./10%), image formation was performed using an original copy having an image area ratio of 10% and an initial developability was evaluated. Then 10,000 sheets of the recording medium were continuously copied and developability was further evaluated. The results are listed in Tables 5 to 7.

As shown in Tables 5 to 7, image quality was good and a continuous copy did not cause any substantial image alternation or member contamination. In addition, there was no toner scattering, so that good image formation was attained.

Evaluation method for evaluating the developability is described as follows.

[Change in Image Density]

An image density was measured using a Macbeth concentration meter or a color reflective concentration meter (e.g., Color reflection densitometer X-RITE 404 A, manufactured by X-Rite, Co., Ltd.).

The evaluation was performed with reference to the following criteria from a difference between an initial concentration and a concentration after durably printing 10,000 sheets.

A: 0.1% or less,
B: more than 0.1% and 0.2% or less,
C: more than 0.2% and 0.3% or less, and
D: more than 0.3%.

[Fogging]

The degree of fogging was estimated by measuring reflectivity of an image using REFLECTROMETER MODEL TC-6DS (manufactured by Tokyo Denshoku Co., Ltd.) and substituting the obtained reflectivity into the following equation. The obtained degree of fogging was evaluated with reference to the following criteria. The less the fogging generates, the more the quality of an image improves. Used as a sample was an image obtained after durably printing 10,000 sheets.

Fogging (%)=(the reflectivity of normal paper, %)−(the reflectivity of white solid part of the sample, %)

A: 1.2% or less,
B: more than 1.2% and 1.6% or less,

C: more than 1.6% and 2.0% or less, and

D: more than 2.0%.

[Change in Charging Amount]

A change in charging amount of a developer in a developing container was evaluated on the basis of the following criteria by measuring a variation between a charging amount at an initial stage of a duration test and a charging amount after durably printing 10,000 sheets.

A: a variation of 10% or less with respect to the charging amount at the initial stage, B: a variation of more than 10% and 15% or less with respect to the charging amount at the initial stage, C: a variation of more than 15% and 20% or less with respect to the charging amount at the initial stage, and D: a variation of more than 20% with respect to the charging amount at the initial stage.

The charging amount of a toner was measured by the following procedure. 2 parts by mass of a toner is mixed with 98 parts by mass of a ferrite carrier coated with a resin and the mixture was left at normal temperature and normal pressure for 24 hours. Then, the mixture was shaken in a shaking machine for 2 minutes. The ferrite carrier used was prepared by coating a Cu—Zn—Fe ternary ferrite core (Fe: about 50%, Cu: about 10%, Zn: about 10%) with about 1 mass % of a 50:50 mixture of polyvinylidene fluoride and styrene-methyl methacrylate copolymer, and the obtained ferrite carrier contained 70 mass% or more of particles of 250-mesh pass and 350-mesh on.

Figure 6:
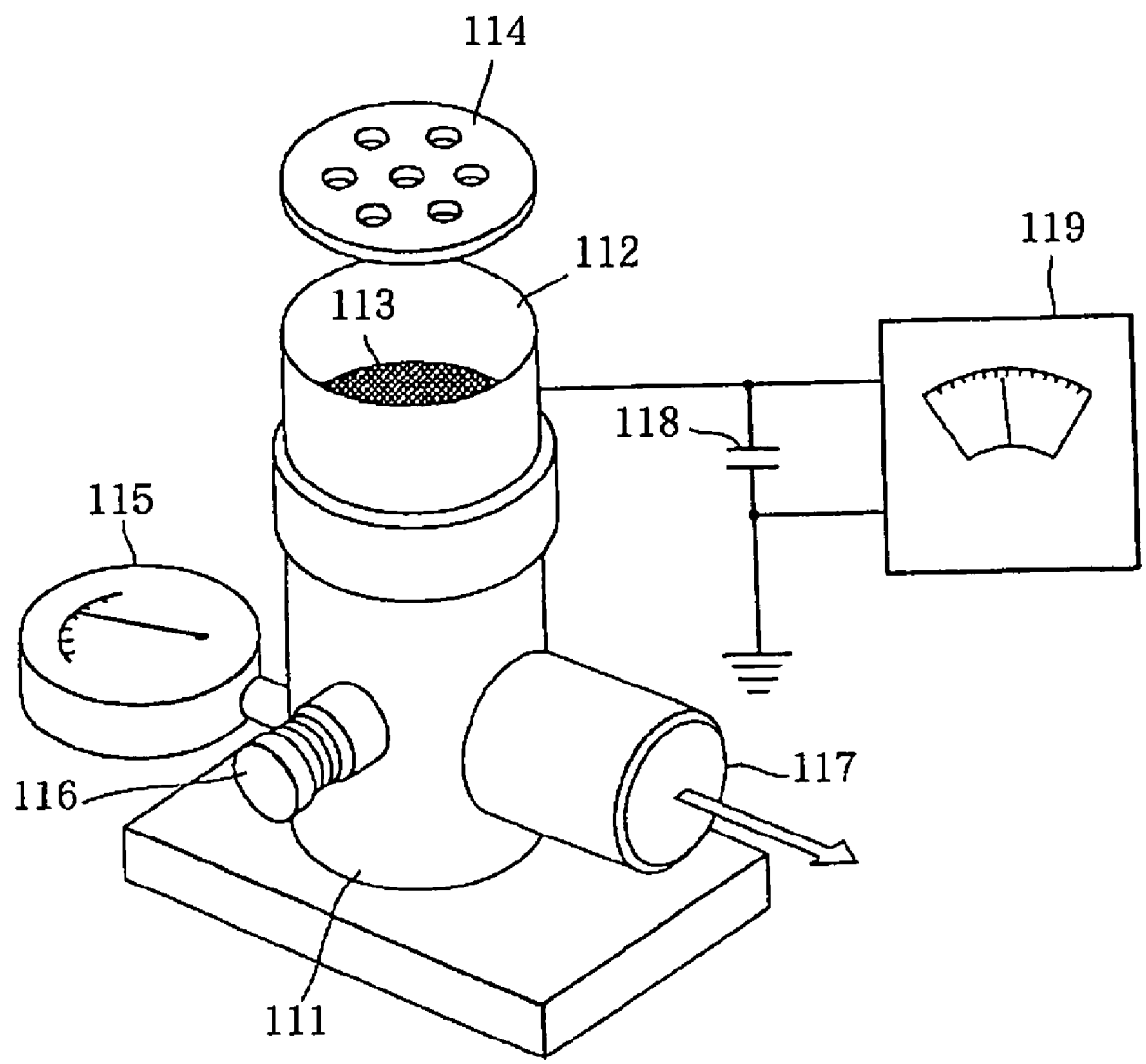
FIG. 6 is a schematic diagram showing an instrument for measuring the amount of triboelectrification.

FIG. 6 is a schematic diagram of a charging amount measuring instrument for measuring the amount of triboelectrification of a toner. A mixture of a toner whose triboelectrification charging amount was to be measured and a carrier was placed in a polyethylene bottle having a capacity of 50 to 100 ml and the bottle was shaken by hand for 5 to 10 minutes. Then, about 0.5 to 1.5 g of the mixture (developer) was placed in a metal measurement vessel 112 having a 500-mesh screen 113 at its bottom and the vessel 112 was covered with a metal lid 114. The weight of the whole measurement vessel 112 was measured and was represented by $W_1$ (g). Then, in a suction machine 111 (at least a portion in contact with the measurement vessel 112 was made from an insulating material), suction was made from a suction port 117 to set the pressure of a vacuum meter 115 to 250 mmAq by controlling an airflow control valve 116. In this state, the toner was absorbed and removed by suction for a sufficient period of time, preferably for 2 minutes. The potential of a potentiometer 119 at this point is represented by V. Reference numeral 118 denotes a capacitor whose capacity is represented by C ($\mu$F). The weight of the whole measurement vessel after suction was measured and was represented by $W_2$ (g). The frictional charging amount of the toner (mC/kg) is calculated from the above measurement values based on the following equation.

Frictional charging amount of toner (mC/kg)=$(C \times V)/(W_1-W_2)$

[Contamination of Charging Roller]

The Contamination of the charging roller was evaluated on the basis of the following evaluation criteria by visually observing the surface of the roller and an image.

A: No defect can be found on the surface of the roller and the image,

B: In the end half of the durable test, the surface of the roller was contaminated a little but the image was not contaminated, C: In the end half of the durable test, the surface of the roller is contaminated a little and a small amount of uneven portions can be found in the image, and D: In the end half of the durable test, the surface of the roller is very dirty and the resulting image has uneven portions.

[Transfer Efficiency]

The transfer efficiency of the developer after printing 10,000 sheets was evaluated using an image forming apparatus as shown in FIG. 1 under normal temperature and humidity conditions (N/N: 23° C./50%). That is, the percentage of the weight of the toner being transferred on the paper with respect to the weight of toner being developed on the photoconductor was evaluated on the basis of the following evaluation criteria.

A: 90% or more,

B: more than 80% and less than 90%,

C: more than 70% and less than 80%, and

D: less than 70%.

[Solid Uniformity]

An image on the solid portion of the resulting transfer paper was evaluated from 5-point concentration differences and the results are classified as A, B, C, and D.

Furthermore, an image after durably printing 10,000 sheets was used as a sample.

A: 0.1% or less,

B: more than 0.1% and 0.2% or less,

C: more than 0.2% and 0.3% or less, and

D: more than 0.3%.

[Drum Chipping]

Chipping of the drum was evaluated on the basis of following criteria by visually observing the surface of the drum and an image after durably printing 10,000 sheets.

A: There is no defect found on the surface of the drum and the image,

B: In the end half of the durable test, a decrease in gloss of the surface of the drum was slightly recognized but no trouble was found in the image, C: In the end half of the durable test, some scratches were formed on the surface of the drum and a small number of streaks were found on the image, and D: In the end half of the durable test, deep scratches were formed on the surface of the drum and some streaks were found on the image.

[Drum Fusion]

A fusion on the drum was evaluated on the basis of following criteria by visually observing the surface of the drum and a white solid image after durably printing 10,000 copies.

A: There is no defect found on the surface of the drum, and on the image.

B: In the end half of the durable test, the surface of the drum was contaminated a little but not on the image.

C: In the end half of the durable test, the surface of the drum is contaminated a little and a small amount of black spots can be found in the image.

D: In the end half of the durable test, the surface of the drum is very dirty and the resulting image has black spots.

EXAMPLES 2 TO 19 AND COMPARATIVE EXAMPLES 1 TO 7

Evaluation tests were performed in the same manner as in Example 1, except that toners, coated carriers, and charging rollers numbered as shown in Table 5 were used. The evaluation results are shown in Tables 6 and 7.

EXAMPLE 20

An evaluation test was performed in the same manner as in Example 1, except that the toner charging control unit was removed. The evaluation results are shown in Tables 6 and 7.

EXAMPLE 21

An evaluation test was performed in the same manner as in Example 1, except that the toner charging control unit was removed while a cleaning blade was mounted. The evaluation results are shown in Tables 6 and 7.

EXAMPLES 22 AND 23

An evaluation test was performed in the same manner as in Example 1, except that polyester resins having molecular weights shown in Table 5 were used as the outermost layer resin of the photosensitive drum instead of the polyallylate resin. The evaluation results are shown in Tables 6 and 7.

EXAMPLE 24

As in the case of Example 1 using the cyan two-component developer, a yellow two-component developer, a magenta two-component developer, and a black two-component developer were obtained by using the yellow toner 1, the magenta toner 1, and the black toner 1, respectively. The two-component developers of the above respective four colors were put in an image forming apparatus shown in FIG. 7. Subsequently, full color printing was performed on 20,000 sheets. Good results were obtained as in the case of Example 1.

Figure 7:
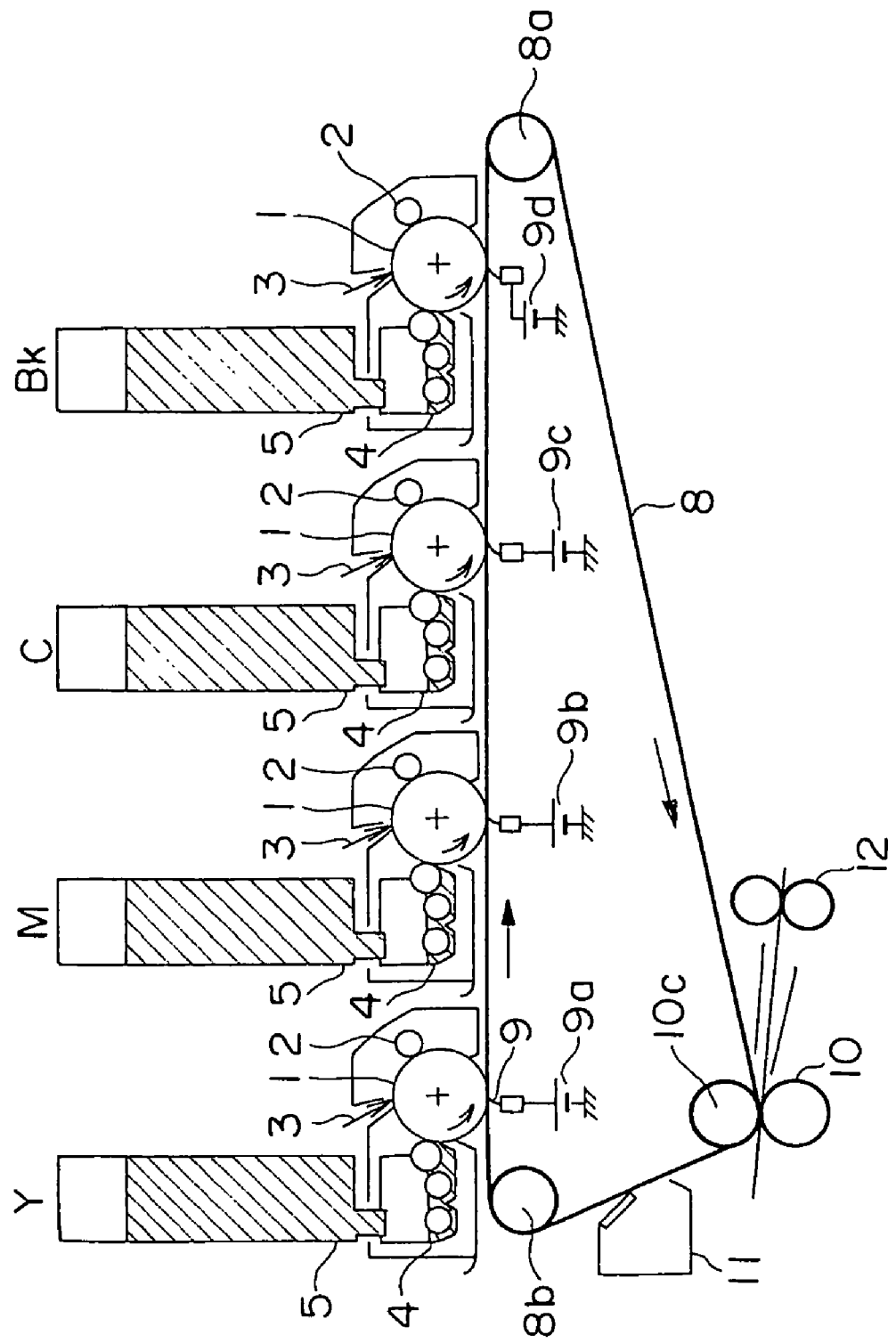
FIG. 7 is a schematic diagram showing a full color image forming apparatus which can carry out an image forming method to which the present invention can be applied.

The image forming device shown in FIG. 7 was obtained by changing the developer of the CP2100 full-color copier manufactured by Canon Corporation to a developer of a roller charging system similar to that shown in FIG. 1 (Example 1) and changing the paper feed belt to a polyimide intermediate transfer belt 8. Reference symbols 8a and 8b denote tension rollers; 9, a primary transfer blade; 10, a secondary transfer roller; 11, an intermediate transfer belt cleaner; and 12, a paper feed roller.

TABLE 5

(Conditions of evaluations)

|  | Toner No. | Coated carrier No. | Charging roller No. | Surface hardness of charging roller | outermost layer of photosensitive drum Kinds of binder resin | Molecular weight of binder resin | cleaning blade | toner charging control unit |
|---|---|---|---|---|---|---|---|---|
| Example 1 | 1 | 1 | 1 | 62 | Polyarylate | 150,000 | None | Used |
| Example 2 | 2 | 1 | 1 | 62 | Polyarylate | 150,000 | None | Used |
| Example 3 | 3 | 1 | 1 | 62 | Polyarylate | 150,000 | None | Used |
| Example 4 | 4 | 1 | 1 | 62 | Polyarylate | 150,000 | None | Used |
| Example 5 | 5 | 1 | 1 | 62 | Polyarylate | 150,000 | None | Used |
| Example 6 | 11 | 1 | 4 | 35 | Polyarylate | 150,000 | None | Used |
| Example 7 | 12 | 1 | 5 | 77 | Polyarylate | 150,000 | None | Used |
| Example 8 | 13 | 7 | 1 | 62 | Polyarylate | 150,000 | None | Used |
| Example 9 | 14 | 1 | 1 | 62 | Polyarylate | 150,000 | None | Used |
| Example 10 | 15 | 1 | 1 | 62 | Polyarylate | 150,000 | None | Used |
| Example 11 | 16 | 8 | 1 | 62 | Polyarylate | 150,000 | None | Used |
| Example 12 | 17 | 9 | 1 | 62 | Polyarylate | 150,000 | None | Used |
| Example 13 | 18 | 4 | 1 | 62 | Polyarylate | 150,000 | None | Used |
| Example 14 | 19 | 5 | 1 | 62 | Polyarylate | 150,000 | None | Used |
| Example 15 | 1 | 2 | 1 | 62 | Polyarylate | 150,000 | None | Used |
| Example 16 | 1 | 3 | 1 | 62 | Polyarylate | 150,000 | None | Used |
| Example 17 | 1 | 6 | 1 | 62 | Polyarylate | 150,000 | None | Used |
| Example 18 | 1 | 1 | 2 | 25 | Polyarylate | 150,000 | None | Used |
| Example 19 | 1 | 1 | 3 | 85 | Polyarylate | 150,000 | None | Used |
| Example 20 | 1 | 1 | 1 | 62 | Polyarylate | 150,000 | None | None |
| Example 21 | 1 | 1 | 1 | 62 | Polyarylate | 150,000 | Used | None |
| Example 22 | 1 | 1 | 1 | 62 | Polyester | 58,000 | None | Used |
| Example 23 | 1 | 1 | 1 | 62 | Polyester | 220,000 | None | Used |
| Comparative Example 1 | 6 | 1 | 1 | 62 | Polyarylate | 150,000 | None | Used |
| Comparative Example 2 | 7 | 1 | 1 | 62 | Polyarylate | 150,000 | None | Used |
| Comparative Example 3 | 8 | 1 | 1 | 62 | Polyarylate | 150,000 | None | Used |
| Comparative Example 4 | 9 | 1 | 1 | 62 | Polyarylate | 150,000 | None | Used |
| Comparative Example 5 | 10 | 1 | 1 | 62 | Polyarylate | 150,000 | None | Used |
| Comparative Example 6 | 20 | 1 | 1 | 62 | Polyarylate | 150,000 | None | Used |
| Comparative Example 7 | 21 | 1 | 1 | 62 | Polyarylate | 150,000 | None | Used |

TABLE 6

(Results at H/H enviroment)

| | Chqnge in image density | Fogging | Change in charging amount | Contamination of charging roller | Transfer efficiency | Solid uniformity | Drum chipping | Drum fusion |
|---|---|---|---|---|---|---|---|---|
| Example 1 | A | A | A | A | A | A | A | A |
| Example 2 | B | A | B | A | B | A | A | A |
| Example 3 | A | A | B | B | A | A | A | B |
| Example 4 | B | A | B | A | B | A | A | A |
| Example 5 | A | A | B | B | A | A | B | B |
| Example 6 | B | C | B | B | C | C | B | B |
| Example 7 | A | A | B | B | A | B | B | B |
| Example 8 | A | C | C | C | A | C | A | C |
| Example 9 | B | C | B | B | C | B | B | B |
| Example 10 | B | B | C | C | A | A | B | C |
| Example 11 | B | C | B | B | C | B | B | C |
| Example 12 | B | B | C | C | C | B | C | B |
| Example 13 | B | A | B | C | C | B | C | C |
| Example 14 | A | A | A | B | B | B | B | B |
| Example 15 | B | B | C | A | A | B | C | B |
| Example 16 | B | B | B | A | A | B | B | B |
| Example 17 | B | B | C | A | A | B | C | B |
| Example 18 | A | A | A | C | A | C | B | C |
| Example 19 | A | A | A | C | A | C | C | B |
| Example 20 | A | A | A | C | A | C | B | C |
| Example 21 | A | A | A | A | A | A | B | A |
| Example 22 | A | A | A | B | C | B | C | B |
| Example 23 | A | A | A | A | B | C | B | C |
| Comparative Example 1 | D | A | C | A | D | B | A | A |
| Comparative Example 2 | B | A | A | C | B | B | B | D |
| Comparative Example 3 | B | D | D | C | D | C | B | C |
| Comparative Example 4 | B | C | C | C | B | B | D | D |
| Comparative Example 5 | B | C | C | C | B | B | D | D |
| Comparative Example 6 | B | D | D | C | D | C | B | D |
| Comparative Example 7 | B | D | D | C | D | C | B | D |

TABLE 7

(Results at L/L enviroment)

| | Chqnge in image density | Fogging | Change in charging amount | Contamination of charging roller | Transfer efficiency | Solid uniformity | Drum chipping | Drum fusion |
|---|---|---|---|---|---|---|---|---|
| Example 1 | A | A | A | A | A | A | A | A |
| Example 2 | B | A | B | A | B | A | A | A |
| Example 3 | A | A | B | B | A | A | A | B |
| Example 4 | B | A | B | A | B | A | A | A |
| Example 5 | A | A | B | B | A | A | B | B |
| Example 6 | B | B | B | B | B | B | B | B |
| Example 7 | A | A | B | B | A | B | B | B |
| Example 8 | A | B | B | C | A | B | A | C |
| Example 9 | B | B | B | B | C | B | B | B |
| Example 10 | B | B | B | C | A | A | B | C |
| Example 11 | B | B | B | B | B | B | B | C |
| Example 12 | B | B | B | C | B | B | C | B |
| Example 13 | B | A | B | C | B | B | C | C |
| Example 14 | A | A | A | B | B | B | B | B |
| Example 15 | B | B | B | A | A | B | C | B |
| Example 16 | B | B | B | A | A | B | B | B |
| Example 17 | B | B | B | A | A | B | C | B |
| Example 18 | A | A | A | C | A | B | B | C |
| Example 19 | A | A | A | C | A | B | C | B |
| Example 20 | A | A | A | C | A | B | B | C |
| Example 21 | A | A | A | A | A | A | B | A |
| Example 22 | A | A | A | B | B | B | C | B |
| Example 23 | A | A | A | A | B | B | B | C |
| Comparative Example 1 | D | A | C | A | B | B | A | A |
| Comparative Example 2 | B | A | A | D | B | B | B | D |
| Comparative Example 3 | B | C | D | C | C | C | B | C |
| Comparative Example 4 | B | B | C | C | B | B | D | D |
| Comparative Example 5 | B | B | C | C | B | B | D | D |
| Comparative Example 6 | B | C | D | D | C | C | B | D |
| Comparative Example 7 | B | C | D | D | C | C | B | D |

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. A silica fine particle which has been hydrophobic treated, and has a peak in a particle diameter range of 0.04 μm or more and less than 1 μm and a peak in the particle diameter range of 1 μm or more and less than 100 μm in a volume-basis particle diameter distribution measured by using a laser diffraction particle diameter distribution-meter,
   wherein the silica fine particle has a frequency ratio of 10 to 80% for the particles with a particle diameter in the range of 0.04 μm or more and less than 1 μm to a total of all the peaks, and has the frequency ratio of less than 16% for the particles with the particle diameter of 20 μm or more and less than 2000 μm to the total of all the peaks, respected to the volume-basis particle diameter distribution.

2. The silica fine particle according to claim 1, wherein the silica fine particle has the frequency ratio of 20 to 70% for the particles with the particle diameter in the range of 0.04 μm or more and less than 1 μm to the total of all the peaks, and have the frequency ratio of less than 12% for the particles with the particle diameter in the range of 20 μm or more and less than 2000 μm to the total of all the peaks, respect to the volume-basis particle diameter distribution measured by using the laser diffraction particle diameter distribution meter.

3. The silica fine particle according to claim 1, wherein a half-value width of a maximum peak present in a range of 1 μm or more and less than 100 μm in particle diameter is 5 to 25 μm with respect to the volume-basis particle diameter distribution measured by using the laser diffraction particle diameter distribution meter.

4. The silica fine particle according to claim 1, wherein a half-value width of a maximum peak present in a range of 1 μm or more and less than 100 μm in particle diameter is 8 to 20 μm with respect to the volume-basis particle diameter distribution measured by using the laser diffraction particle diameter distribution meter.

5. The silica fine particle according to claim 1, wherein a volume average particle diameter is 0.1 to 20 μm with respect to the volume-basis particle diameter distribution measured by using the laser diffraction particle diameter distribution meter.

6. The silica fine particle according to claim 1, wherein a volume average particle diameter is 0.3 to 12 μm with respect to the volume-basis particle diameter distribution measured by using the laser diffraction particle diameter distribution meter.

7. The silica fine particle according to claim 1., wherein a BET specific surface area is in a range of 30 m$^2$/g or more and less than 100 m$^2$/g.

8. The silica fine particle according to claim 1, which comprising composite particle formed by combining a plurality of primary particles.

9. The silica fine particle according to claim 1, wherein the silica fine particle is hydrophobic treated with a silane coupling agent and/or silicone oil.

10. The silica fine particle according to claim 1, wherein the silica fine particle is obtained by treating a silica fine particle with a silane coupling agent and silicone oil and then subjecting the silica fine particle to classify and/or crush.

11. The silica fine particle according to claim 1, wherein the silica fine particle is treated with silicone oil, and an addition amount of the silicone oil is 3 to 35 parts by mass with respect to 100 parts by mass of silica fine particles before the treatment.

12. The silica fine particle according to claim 1, wherein the silica fine particle is treated with silicone oil, and an addition amount of the silicone oil is 5 to 25 parts by mass with respect to 100 parts by mass of silica particles before the treatment.

13. A toner comprising a toner particle and an external additive, wherein:
   the toner particle has a weight average particle diameter of 4 to 9 μm; and
   the external additive contains at least a silica fine particle (A) which has been hydrophobic treated, and has a peak in a particle diameter range of 0.04 μm or more and less than 1 μm and a peak in the range of 1 μm or more and less than 100 μm in a volume-basis particle diameter distribution measured by using a laser diffraction particle diameter distribution meter,
   the silica fine particle (A) has a frequency ratio of 10 to 80% for the particles with a particle diameter in the range of 0.04 μm or more and less than 1 μm to a total of all the peaks, and has the frequency ratio of less than 16% for the particles with the particle diameter of 20 μm or more and less than 2000 μm to the total of all the peaks, respected to the volume-basis particle diameter distribution.

14. The toner according to claim 13, wherein the silica fine particle (A) has the frequency ratio of 20 to 70% for the particles with the particle diameter in the range of 0.04 μm or more and less than 1 μm to the total of all the peaks and has the frequency ratio of less than 12% for the particles with the particle diameter of 20 μm or more and less than 2000 μm to the total of all the peaks, respected to the volume-basis particle diameter distribution measured by using the laser diffraction particle diameter distribution meter.

15. The toner according to claim 13, wherein the silica fine particle (A) has a half-value width of a maximum peak present in a range of 1 μm or more and less than 100 μm in particle diameter of 5 to 25 μm with respect to the volume-basis particle diameter distribution measured by using a laser diffraction particle diameter distribution meter.

16. The toner according to claim 13, wherein the silica fine particle (A) has a half-value width of a maximum peak present in a range of 1 μm or more and less than 100 μm in particle diameter of 8 to 20 μm with respect to the volume-basis particle diameter distribution measured by using a laser diffraction particle diameter distribution meter.

17. The toner according to claim 13, wherein the silica fine particle (A) has a volume average particle diameter of 0.1 to 20 μm with respect to the volume-basis particle diameter distribution measured by using a laser diffraction particle diameter distribution meter.

18. The toner according to claim 13, wherein the silica fine particle (A) has a volume average particle diameter of 0.3 to 12 μm with respect to the volume-basis particle diameter distribution measured by using a laser diffraction particle diameter distribution meter.

19. The toner according to claim 13, wherein the silica fine particle (A) has a BET specific surface area in a range of 30 m$^2$/g or more and less than 100 m$^2$/g.

20. The toner according to claim 13, wherein the silica fine particle (A) comprises a composite particle formed by combining a plurality of primary particles.

21. The toner according to claim 13, wherein the silica fine particle (A) has been hydrophobic treated with a silane coupling agent and/or silicone oil.

22. The toner according to claim 13, wherein the silica fine particle (A) is obtained by treating silica fine particle with a silane coupling agent and silicone oil and then subjecting the silica fine particle to classification and/or crush.

23. The toner according to claim 13, wherein the silica fine particle (A) is treated with silicone oil, and an addition amount of the silicone oil is 3 to 35 parts by mass with respect to 100 parts by mass of silica fine particles before the treatment.

24. The toner according to claim 13, wherein the silica fine particle (A) is treated with silicone oil, and an addition amount of the silicone oil is 5 to 25 parts by mass with respect to 100 parts by mass of silica fine particles before the treatment.

25. The toner according to claim 13, further comprising at least one kind of a fine particle (B) having an average length of primary particles, which is smaller than that of the silica fine particle (A).

26. The toner according to claim 25, wherein the fine particle (B) has a BET specific surface area in a range of 100 m$^2$/g or more and less than 200 m$^2$/g.

27. The toner according to claim 25, wherein the fine particle (B) has a number average length of the primary particles in the range of 1 to 50 nm.

28. The toner according to claim 25, wherein the fine particle (B) is selected from the group consisting of an alumina fine particle, a titanium oxide fine particle, a zirconium oxide fine particle, a magnesium oxide fine particle, a silica fine particle, and a composite fine particle thereof.

29. The toner according to claim 25, wherein the fine particle (B) is a silica fine particle treated with at least silicone oil or a titanium oxide fine particle treated with a silane coupling agent.

30. The toner according to claim 25, wherein 0.1 to 2.0 parts by mass of the fine particle (B) is contained with respect to 100 parts by mass of toner particles.

31. The toner according to claim 13, wherein 0.05 to 1.0 part by mass of the silica fine particle (A) is contained with respect to 100 parts by mass of toner particles.

32. The toner according to claim 13, wherein the toner is a non-magnetic toner.

33. The toner according to claim 13, wherein the toner particle has an average circularity of 0.950 to 0.995, which is measured using a flow type particle image analyzer.

34. The toner according to claim 13, wherein the toner particle has an average circularity of 0.960 to 0.995, which can be measured using a flow type particle image analyzer.

35. The toner according to claim 13, wherein the toner particle is produced in an aqueous medium.

36. The toner according to claim 13, wherein the toner particle is manufactured by polymerizing a polymerizable monomer composition that comprises at least a polymerizable monomer and a colorant in a solvent in the presence of a polymerization initiator.

37. A two-component developer comprising a carrier and a toner having at least a toner particle and an external additive, wherein:
the toner particle has a weight average particle diameter of 4 to 9 µm;
the external additive contains at least a silica fine particle (A) which has been hydrophobic treated, and has a peak in a particle diameter range of 0.04 µm or more and less than 1 µm and a peak in the particle diameter range of 1 µm or more and less than 100 µm in a volume-basis particle diameter distribution measured by using a laser diffraction particle diameter distribution meter,
the silica fine particle (A) has a frequency ratio of 10 to 80% for the particles with a particle diameter in the range of 0.04 µm or more and less than 1 µm to a total of all the peaks, and has the frequency ratio of less than 16% for the particles with the particle diameter of 20 µm or more and less than 2000 µm to the total of all the peaks, respected to the volume-basis particle diameter distribution; and
the carrier has a 50% particle diameter of 15 to 60 µm on the basis of volume, and a shape factor SF-1 of 100 to 130.

38. The two-component developer according to claim 37, wherein the carrier comprises 5% by volume or less of particles each having the particle diameter that corresponds to ⅔ or less of the 50% particle diameter.

39. The two-component developer according to claim 37, wherein the carrier has a resistivity of $1 \times 10^8$ to $1 \times 10^{16}$ Ω·m and a magnetization of 20 to 100 (Am$^2$/kg) at 1000/4π (kA/m).

40. The two-component developer according to claim 37, wherein the carrier is a magnetic substance dispersion coated carrier, which comprises a core in which a metal compound is dispersed in a binder resin, and a surface of the core is coated with a resin.

41. The two-component developer according to claim 40, wherein:
the metal compound comprises at least two kinds of metal compound particles;
a ratio of the metal compound to the binder resin is 80 to 99% by mass, one of the two kinds of the metal compound particles is a ferromagnetic body and the other is a non-magnetic metal compound having a resistance higher than the ferromagnetic substance; and
a ratio of the ferromagnetic substance to a total amount of the metal compound particles is 50 to 95% by mass.

42. The two-component developer according to claim 41, wherein the metal compound of the carrier comprises magnetite as the ferromagnetic substance and hematite as the non-magnetic metal compound.

43. The two-component developer according to claim 40, wherein the binder resin of the carrier is made of a thermosetting resin and has a crosslinked structure.

44. The two-component developer according to claim 40, wherein the binder resin of the carrier comprises a phenolic resin.

45. The two-component developer according to claim 37, wherein
the toner comprises the toner according to any one of claims 14 to 36.

46. An image forming method using an image forming apparatus comprising: an image bearing member; a charging unit charging a surface of the image bearing member; an information-writing unit forming an electrostatic latent image on the image bearing member being charged; a developing unit visualizing the electrostatic latent image with a toner; and a transfer unit transferring a visualized toner image to a transfer material directly or through an intermediate transfer member, wherein:
the toner comprises at least a toner-particle and an external additive, and the toner particle has a weight average particle diameter of 4 to 9 µm; and
the external additive contains at least a silica fine particle (A) which has been hydrophobic treated, and has a peak in a particle diameter range of 0.04 µm or more and less than 1 μm and a peak in the particle diameter range of 1 μm or more and less than 100 μm in a volume-basis particle diameter distribution measured by using a laser diffraction particle diameter distribution meter, the silica fine particle (A) has a frequency ratio of 10 to 80% for the particles with a particle diameter in the range of 0.04 μm or more and less than 1 μm to a total of all the peaks, and has the frequency ratio of less than 16% for the particles with the particle diameter of 20 μm or more and less than 2000 μm to the total of all the peaks, respected to the volume-basis particle diameter distribution.

47. The image forming method according to claim 46, wherein the charging unit comprises a charging roller which has a surface hardness of 30 to 80 degrees on the basis of Asker C.

48. The image forming method according to claim 46, wherein the charging unit comprises a charging roller which has a surface hardness of 40 to 70 degrees on the basis of Asker C.

49. The image forming method according to claim 46, wherein the image forming method utilizes a tandem system.

50. The image forming method according to claim 46, wherein the image forming apparatus further comprises a cleaning blade to be brought into contact with the image bearing member.

51. The image forming method according to claim 46, wherein the developing unit adopts a cleaning-simultaneous-with developing system, which recovers a transfer residual toner while developing the electrostatic latent image.

* * * * *

UNITED STATES PATENT AND TRADEMARK OFFICE
CERTIFICATE OF CORRECTION

PATENT NO. : 7,014,969 B2
APPLICATION NO. : 10/676463
DATED : March 21, 2006
INVENTOR(S) : Shinya Yachi et al.

It is certified that error appears in the above-identified patent and that said Letters Patent is hereby corrected as shown below:

ON COVER PAGE AT (74) ATTORNEYS, AGENT OR FIRM

"Fitzpatrick, Cellar, Harper & Scinto" should read --Fitzpatrick, Cella, Harper & Scinto--.

COLUMN 27

Line 50, "Nβ(aminoethyl)" should read --N-β(aminoethyl)--.

COLUMN 28

Line 23, "μ minosilane" should read --Aminosilane--.

COLUMN 36

Line 59, "$(CH_3)_2N-C_3H_6-Si-(OCH_3)_3(2)$" should read
--$(CH_3)_2N-C_3H_6-Si-(OCH_3)_3$      (2)--.

COLUMN 39

Line 23, "500 Mm" should read --500 μm--.

COLUMN 40

Line 48, "ORGANIC" should read --INORGANIC--.

COLUMN 41

Line 1, "ORGANIC" should read --INORGANIC--;
Line 12, "ORGANIC" should read --INORGANIC--;
Line 24, "ORGANIC" should read --INORGANIC--;
Line 35, "ORGANIC" should read --INORGANIC--;
Line 46, "ORGANIC" should read --INORGANIC--; and
Line 57, "ORGANIC" should read --INORGANIC--.

UNITED STATES PATENT AND TRADEMARK OFFICE
CERTIFICATE OF CORRECTION

PATENT NO. : 7,014,969 B2
APPLICATION NO. : 10/676463
DATED : March 21, 2006
INVENTOR(S) : Shinya Yachi et al.

It is certified that error appears in the above-identified patent and that said Letters Patent is hereby corrected as shown below:

COLUMN 42

Line 1, "ORGANIC" should read --INORGANIC--
Line 13, "ORGANIC" should read --INORGANIC--;
Line 24, "ORGANIC" should read --INORGANIC--; and
Line 38, "ORGANIC" should read --INORGANIC--.

COLUMN 43

Line 8, "ORGANIC" should read --INORGANIC--.

COLUMN 55

Line 13, "distribution-meter," should read --distribution meter,--; and
Line 55, "claim 1.," should read --claim 1,--.

Signed and Sealed this

Thirty-first Day of October, 2006

JON W. DUDAS
*Director of the United States Patent and Trademark Office*